(12) United States Patent
Yamaji

(10) Patent No.: US 8,176,305 B2
(45) Date of Patent: May 8, 2012

(54) INFORMATION PROCESSING APPARATUS, ACTIVATION METHOD, AND PROGRAM

(75) Inventor: Hidenori Yamaji, Tokyo (JP)

(73) Assignee: Sony Corporation (JP)

( * ) Notice: Subject to any disclaimer, the term of this patent is extended or adjusted under 35 U.S.C. 154(b) by 379 days.

(21) Appl. No.: 12/448,573

(22) PCT Filed: Dec. 28, 2007

(86) PCT No.: PCT/JP2007/075241
§ 371 (c)(1),
(2), (4) Date: Jun. 25, 2009

(87) PCT Pub. No.: WO2008/081915
PCT Pub. Date: Jul. 10, 2008

(65) Prior Publication Data
US 2010/0095143 A1    Apr. 15, 2010

(30) Foreign Application Priority Data
Dec. 28, 2006    (JP) ................................ 2006-355321

(51) Int. Cl.
*G06F 9/00*    (2006.01)
(52) U.S. Cl. ............................. 713/1; 713/300; 710/302
(58) Field of Classification Search ............ 713/30–340, 713/1; 710/301–304
See application file for complete search history.

(56) References Cited

U.S. PATENT DOCUMENTS
6,349,386 B1    2/2002  Chan
7,325,148 B2 *  1/2008  Inoue et al. .................. 713/300

FOREIGN PATENT DOCUMENTS
| JP | 10-063487 A | 3/1998 |
| JP | 2003-520365 T | 7/2003 |
| JP | 2004-227363 A | 8/2004 |
| JP | 2004-362426 A | 12/2004 |
| JP | 2006-101459 A | 4/2006 |
| WO | WO-01/15159 A1 | 3/2001 |

OTHER PUBLICATIONS

Office Action from Japanese Application No. 2006-355321, dated Sep. 14, 2010.

* cited by examiner

*Primary Examiner* — Brian Misiura
*Assistant Examiner* — Kim Huynh
(74) *Attorney, Agent, or Firm* — Lerner, David, Littenberg, Krumholz & Mentlik, LLP

(57) ABSTRACT

The present invention relates to an information processing apparatus, an activation method, and a program which allow activation to be performed more quickly so as to enter a state according to a user's operation. A host CPU (11) causes a state to transition to an initial state, which is an initial state of a working state and in which execution of application processing is inhibited, before entering a suspend state. An embedded controller (33) acquires from an input unit (11) a signal indicating an activating factor that serves as an activation trigger. When activating from the suspend state, the host CPU (11) executes return processing to the initial state, and upon returning to the initial state by activation, causes a state to transition to an application execution state in which the application processing according to the activating factor is executed. The present invention can be applied to a digital still camera.

8 Claims, 25 Drawing Sheets

FIG. 7

| | HOST CPU | SDRAM | EMBEDDED CONTROLLER (RTC) |
|---|---|---|---|
| WORKING STATE S0 | ON | ON | ON |
| SUSPEND STATE S3 | OFF | ON | ON |
| HIBERNATION S4 SOFT-OFF STATE S5 | OFF | OFF | ON |
| MECHANICAL OFF STATE G3 | OFF | OFF | OFF (RTC RETAINED) |

(14-3)

(17-2)

(20-1)

(20-2)

(20-3)

INFORMATION PROCESSING APPARATUS, ACTIVATION METHOD, AND PROGRAM

CROSS-REFERENCES TO RELATED APPLICATIONS

The present application is a national phase entry under 35 U.S.C. §371 of International Application No. PCT/JP2007/075241 filed Dec. 28, 2007, published on Jul. 10, 2008 as WO 2008/081915 A1, which claims priority from Japanese Patent Application No. JP 2006-355321 filed in the Japanese Patent Office on Dec. 28, 2006.

The present invention relates to an information processing apparatus, an activation method, and a program, in particular, an information processing apparatus, an activation method, and a program which allow quick activation.

TECHNICAL FIELD

The present invention relates to an information processing apparatus, an activation method, and a program, in particular, an information processing apparatus, an activation method, and a program which allow quick activation.

BACKGROUND ART

Digital still cameras are in wide use. Technologically sophisticated GUIs (graphical user interfaces) have come to be used in digital still cameras, and also, digital still cameras have come to be connected to a network. To meet such requirements for functionality enhancements, high-performance, high-functionality operating systems such as the Linux (registered trademark) have come to be executed in digital still cameras.

Activation of a high-performance, high-functionality, and large-scale operating system such as the Linux (registered trademark) generally takes a long time in comparison to activation of a small-scale operating system such as μITRON (micro industrial the real-time operating system nucleus).

Also, as processing in the application such as the GUI and network connection becomes sophisticated, the application program has become larger in scale, and its activation also takes increasingly more time.

This is also attributable to the fact that a NAND-type flash memory is used for storage of the operating system and the application program, instead of a NOR-type flash memory that allows a stored program to be executed directly. In a case where a program is stored in a NAND-type flash memory, to execute this program, it is necessary to load the program stored in the NAND-type flash memory into a RAM (random access memory) temporarily, and then execute the program loaded into the RAM.

Accordingly, in some conventional configurations, a non-volatile storage unit is arranged on a main storage, information necessary for continuing processing is saved into the non-volatile storage unit and power is shut off, and upon turning the power on, the processing interrupted by the power shutoff is resumed by using the information retained in the non-volatile storage unit, and also, each piece of information necessary for resuming the processing is identified and assigned priority, information is stored into the non-volatile storage unit in order of decreasing priority, and information that cannot not be stored into the non-volatile storage unit is saved into a secondary storage, thereby performing suspend and resume processing efficiently (see, for example, Patent Document 1).

Patent Document 1: Japanese Unexamined Patent Application Publication No. 2004-362426

DISCLOSURE OF INVENTION

Technical Problem

However, in digital still cameras, it is necessary to perform activation according to the activating operation, such that it becomes possible to perform shooting by opening the lens cap, or it becomes possible to browse images that have been shot so far by simply depressing the power button. This requirement cannot be satisfied by simply performing a suspend and a resume.

The present invention has been made in view of the above-mentioned circumstances, and allows activation to be performed more quickly so as to enter a state according to a user's operation.

Technical Solution

An information processing apparatus according to an aspect of the present invention includes state transition means for causing a state to transition to an initial state, which is an initial state of a working state and in which execution of application processing is inhibited, before entering a suspend state, acquiring means for acquiring a signal indicating an activating factor that serves as an activation trigger, and return processing executing means for executing return processing to the initial state when activating from the suspend state. The state transition means causes a state to transition to an application execution state, in which the application processing according to the activating factor is executed, upon returning to the initial state by activation.

The state transition means can be configured to cause a state to transition to an application execution state, in which the application processing according to the activating factor which is one of shooting processing and browse processing is executed, upon returning to the initial state by activation.

The state transition means and the return processing executing means can be configured to be realized by a first CPU (Central Processing Unit) for which supply of power is stopped in the suspend state, and the acquiring means can be configured to be realized by a second CPU to which power is supplied in the suspend state.

The state transition means can be configured to be realized by the first CPU executing an application program, the return processing executing means can be configured to be realized by the first CPU executing the application program and an operating system, and the acquiring means can be configured to be realized by the second CPU executing a program different from the application program and the operating system.

The second CPU can be configured to control cancellation of reset of the first CPU, when activating from the suspend state.

The second CPU can be configured to control supply of power to the first CPU.

An activation method according to an aspect of the present invention includes the steps of causing a state to transition to an initial state, which is an initial state of a working state and in which execution of application processing is inhibited, before entering a suspend state, acquiring a signal indicating an activating factor that serves as an activation trigger, returning to the initial state when activating from the suspend state, and causing a state to transition to an application execution state, in which the application processing according to the activating factor is executed, upon returning to the initial state by activation.

A program according to an aspect of the present invention causes a computer to perform processing including the steps of causing a state to transition to an initial state, which is an initial state of a working state and in which execution of application processing is inhibited, before entering a suspend state, acquiring information indicating an activating factor that serves as an activation trigger, returning to the initial state, when activating from the suspend state, and causing a state to transition to an application execution state, in which the application processing according to the activating factor is executed, upon returning to the initial state by activation.

In the information processing apparatus and the activation method according to an aspect of the present invention, before entering a suspend state, a state is caused to transition to an initial state, which is an initial state of a working state and in which execution of application processing is inhibited, a signal indicating an activating factor that serves as an activation trigger is acquired, and when activating from the suspend state, a return is made to the initial state, and upon returning to the initial state by activation, a state is caused to transition to an application execution state in which the application processing according to the activating factor is executed.

In the program according to an aspect of the present invention, before entering a suspend state, a state is caused to transition to an initial state, which is an initial state of a working state and in which execution of application processing is inhibited, information indicating an activating factor that serves as an activation trigger is acquired, and when activating from the suspend state, a return is made to the initial state, and upon returning to the initial state by activation, a state is caused to transition to an application execution state in which the application processing according to the activating factor is executed.

Advantageous Effects

As described above, according to an aspect of the present invention, a resume can be performed from a suspend state.

Also, according to an aspect of the present invention, activation can be performed more quickly so as to enter a state according to a user's operation.

BRIEF DESCRIPTION OF DRAWINGS

FIG. 7 is a diagram illustrating states of a digital still camera.

Figure 1:
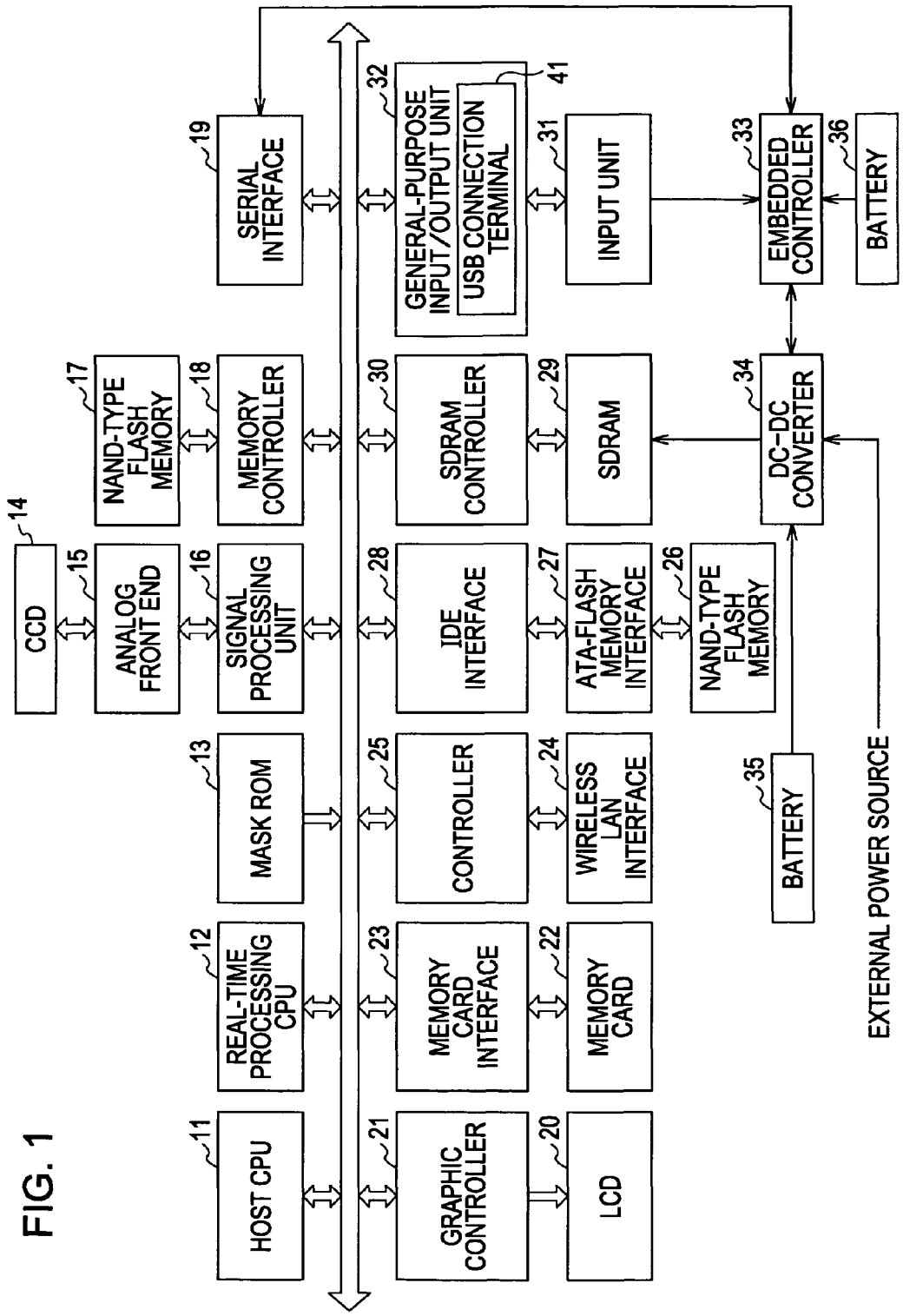
FIG. 1 is a block diagram showing the configuration of a digital still camera as an example of an information processing apparatus according to an embodiment of the present invention.

EXPLANATION OF REFERENCE NUMERALS 11 host CPU, 12 real-time processing CPU, 13 mask ROM, 17 NAND-type flash memory, 19 serial interface, 20 LCD, 22 memory card, 24 wireless LAN interface, 26 NAND-type flash memory, 29 SDRAM, 31 input unit, 32 general-purpose input/output unit, 33 embedded controller, 34 DC-DC converter, 35 battery, 36 battery, 41 USB connection terminal, 61 operating system, 62 application program, 71 kernel, 72 device driver, 73 power management mechanism, 74 sleep state determining program, 75 sleep state information providing program, 76 other-CPU-program reading program, 77 set value storage processing program, 78 warm-boot-image generating program, 81 shooting processing program, 82 browse processing program, 83 setting processing program, 84 USB mass-storage class processing program, 85 state transition processing program, 86 power management program, 101 secondary boot loader, 121 activation-mode-determining-information acquiring program, 122 activation mode determining program, 123 set value reading program, 124 other-CPU-program reading program, 125 warm-boot-image reading program, 141 operating system, 142 application program, 161 activation-mode-determining-information acquiring program, 162 activation method determining program, 163 application activation/termination control program, 171 real-time processing program, 172 GUI processing program, 173 activation screen display program, 201 power control program, 202 other-CPU-reset control program, 203 activation-mode-determining-information acquiring program, 204 activation-mode-determining-information storage processing program, 205 activation-mode-determining-information providing program, 206 battery attachment/detachment detecting program

BEST MODE FOR CARRYING OUT THE INVENTION

FIG. 1 is a block diagram showing the configuration of a digital still camera as an example of an information processing apparatus according to an embodiment of the present invention. The digital still camera includes a host CPU 11, a real-time processing CPU 12, a mask ROM (read only memory) 13, a CCD (charge coupled device) 14, an analog front end 15, a signal processing unit 16, a NAND-type flash memory 17, a memory controller 18, a serial interface 19, an LCD (liquid crystal display) 20, a graphic controller 21, a memory card 22, a memory card interface 23, a wireless LAN (local area network) interface 24, a controller 25, a NAND-type flash memory 26, an ATA (AT attachment)-flash memory interface 27, an IDE (integrated device (drive) electronics) interface 28, an SDRAM (synchronous dynamic random access memory) 29, an SDRAM controller 30, an input unit 31, a general-purpose input/output unit 32, an embedded controller 33, a DC (direct current)-DC converter 34, a battery 35, and a battery 36.

The host CPU 11, the real-time processing CPU 12, the mask ROM 13, the signal processing unit 16, the memory controller 18, the serial interface 19, the graphic controller 21, the memory card interface 23, the controller 25, the IDE interface 28, the SDRAM controller 30, and the general-purpose input/output unit 32 are connected to each other via a bus.

The host CPU 11 is configured by an embedded CPU or a general-purpose CPU, and executes an operating system and an application program to perform GUI processing or the like for performing various kinds of setting, such as the size of an image to be shot, the compression ratio of image data, or exposure or shutter speed, with respect to the digital still camera.

The real-time processing CPU 12 is configured by an embedded CPU or a general-purpose CPU, and executes an operating system and an application program separately from the host CPU 11 to perform real-time processing for controlling individual units of the digital still camera, or the like.

The mask ROM 13 stores data unique to the digital still camera, and a boot loader executed by the host CPU 11 at the time of activation.

Incidentally, activation includes not only activation from a state in which supply of power is stopped, but also activation from a suspend state, hibernation, or a soft-off state, that is, so-called "resume". The mask ROM 13 may store a secondary boot loader together with a boot loader.

The CCD 14 is a so-called image sensor, and is interconnected with the analog front end 15. The CCD 14 outputs to the analog front end 15 an analog signal corresponding to a subject image formed on its photosensitive part by an unillustrated optical system. Incidentally, a CMOS sensor as an image sensor may be provided instead of the CCD 14.

The analog front end 15 is interconnected with the CCD 14 and the signal processing unit 16, and applies predetermined processing such as noise removal to the analog signal corresponding to a subject image from the CCD 14, thereby converting the analog signal into a digital signal. The analog front end 15 supplies the digital signal corresponding to a subject image, which is obtained by the conversion, to the signal processing unit 16.

The signal processing unit 16 applies predetermined processing such as white balance processing or encode processing to the digital signal corresponding to a subject image which is supplied from the analog front end 15. The signal processing unit 16 supplies data corresponding to a subject image, which is obtained through application of the predetermined processing, to the NAND-type flash memory 26 via the bus, the IDE interface 28, and the ATA-flash memory interface 27, or to the memory card 22 via the bus and the memory card interface 23.

The NAND-type flash memory 17 is an example of a non-volatile storage medium, and is interconnected with the memory controller 18. The NAND-type flash memory 17 stores a program to be executed by the host CPU 11 or data required for the execution of the program, and also stores a program to be executed by the real-time processing CPU 12 or data required for the execution of the program.

Further, the NAND-type flash memory 17 stores an image used for activation from hibernation to a working state. As the data of the image stored in the NAND-type flash memory 17, the program and data that are loaded in the SDRAM 29 in the working state of the digital still camera are used as they are. When the image stored in the NAND-type flash memory 17 is loaded to the SDRAM 29, the SDRAM 29 becomes a state of being loaded with the program and data loaded in the working state of the digital still camera.

While the image stored in the NAND-type flash memory 17 will be described below as the image of the program and data executed by the host CPU 11, the image stored in the NAND-type flash memory 17 may be the image of the program and data executed by the host CPU 11 and the image of the program and data executed by the real-time processing CPU 12.

Also, hereinafter, the image stored in the NAND-type flash memory 17 will be also referred to as warm-boot image.

The memory controller 18 controls reading of a program, data, or a warm-boot image from the NAND-type flash memory 17. Further, the memory controller 18 controls writing of various kinds of data such as a warm-boot image into the NAND-type flash memory 17.

The serial interface 19 performs serial communication between the host CPU 11 and the embedded controller 33.

The LCD 20 displays various kinds of image, text, or the like on the basis of control by the graphic controller 21 interconnected with the LCD 20. The graphic controller 21 controls display of the LCD 20.

The memory card 22 is configured by, for example, a MEMORY STICK (registered trademark), and is configured such that the memory card 22 has a non-volatile storage medium built therein and can be inserted into and removed from the digital still camera. When mounted to the digital still camera, the memory card 22 is electrically connected to the memory card interface 23. The memory card interface 23 controls the storage of data into the mounted memory card 22 or reading of data from the memory card 22.

The wireless LAN interface 24 conforms to the IEEE (institute of electrical and electronic engineers) 802.11a, b, or g, and communicates with an access point, another equipment, or the like. The controller 25 interconnects the wireless LAN interface 24 and the bus, and controls the wireless LAN interface 24.

The NAND-type flash memory 26 is an example of a non-volatile storage medium, and stores various kinds of data, such as image data, on the basis of control by the interconnected ATA-flash memory interface 27. The ATA-flash memory interface 27 is an interface between the IDE interface 28 and the NAND-type flash memory 26, and conforms to the ATA standard and communicates with the IDE interface 28. The IDE interface 28 conforms to the IDE standard, and communicates with the ATA-flash memory interface 27. The NAND-type flash memory 26 is connected to the bus via the ATA-flash memory interface 27 and the IDE interface 28, thus making it possible for the host CPU 11 to control the NAND-type flash memory 26 by using a command in the IDE standard with respect to a hard disk or an optical disk drive.

The SDRAM 29 is an example of a memory medium. The SDRAM 29 is interconnected with the SDRAM controller 30, and stores the operating system and the application program that are executed by the host CPU 11, and the operating system and the application program that are executed by the real-time processing CPU 12. The host CPU 11 executes the operating system and the application program stored in the SDRAM 29. Also, the real-time processing CPU 12 executes the operating system and the application program stored in the SDRAM 29.

Incidentally, the SDRAM 29 is endowed with a so-called self-refresh function whereby the SDRAM 29 refreshes stored data (including a program) by itself when supplied with power.

The SDRAM controller 30 controls writing of a program or data into the SDRAM 29, and controls reading of a program or data from the SDRAM 29.

The input unit 31 is configured by a power button, a wireless LAN button, a USB (universal serial bus) button, a switch for detecting the opening/closing of a lens cap (lens shutter), a cross key, a touch panel, or the like. The input unit 31 supplies to the general-purpose input/output unit 32 and the embedded controller 33 a signal responsive to the depression of the power button, the wireless LAN button, or the USB button, a signal responsive to the opening/closing of the lens cap, or a signal responsive to an operation on the cross key, the touch panel, or the like.

The general-purpose input/output unit 32 is a general-purpose serial or parallel input/output interface, and supplies data corresponding to the signal responsive to the depression of the power button, the wireless LAN button, or the USB button, the signal responsive to the opening/closing of the lens cap, or the signal responsive to an operation on the cross key, the touch panel, or the like, which is supplied from the input unit 31, to the host CPU 11 or the real-time processing CPU 12.

Also, the general-purpose input/output unit 32 includes a USB connection terminal 41 for connection to equipment or a cable that complies with the USB standard.

Incidentally, although not shown, when the other terminal of a cable whose one end is connected to equipment such as a personal computer is connected to the USB connection terminal 41, the general-purpose input/output unit 32 supplies to the embedded controller 33 a signal indicating that equipment has been connected to the USB connection terminal 41.

The embedded controller 33 is a so-called embedded CPU, and executes a program stored in a built-in ROM or RAM. On the basis of a signal supplied from the input unit 31, the embedded controller 33 controls the reset of the host CPU 11 or cancellation thereof, in accordance with depression of the power button, the wireless LAN button, or the USB button, or opening/closing of the lens cap.

The embedded controller 33 controls supply of power to the individual units of the digital still camera by the DC-DC converter 34.

The DC-DC converter 34 converts a voltage supplied from the battery 35 as a DC voltage power source or an external power source and, on the basis of control by the embedded controller 33, supplies power (electric power) of a predetermined voltage to the individual units of the digital still camera, or stops supply of power on a part-by-part basis.

The battery 35 is a secondary battery that can be attached to and detached from the digital still camera. The battery 35 supplies electric power for driving the entire digital still camera, via the DC-DC converter 34.

The battery 36 is a primary battery such as a button battery. The battery 36 supplies electric power for operating the embedded controller 33 when no electric power is supplied from an external power source or the battery 35.

Next, description will be given of programs executed by the host CPU 11, programs executed by the real-time processing CPU 12, or programs executed by the embedded controller 33.

In the following description of programs, processing performed by a computer executing a program will be also expressed as being executed by that program.

Figure 2:
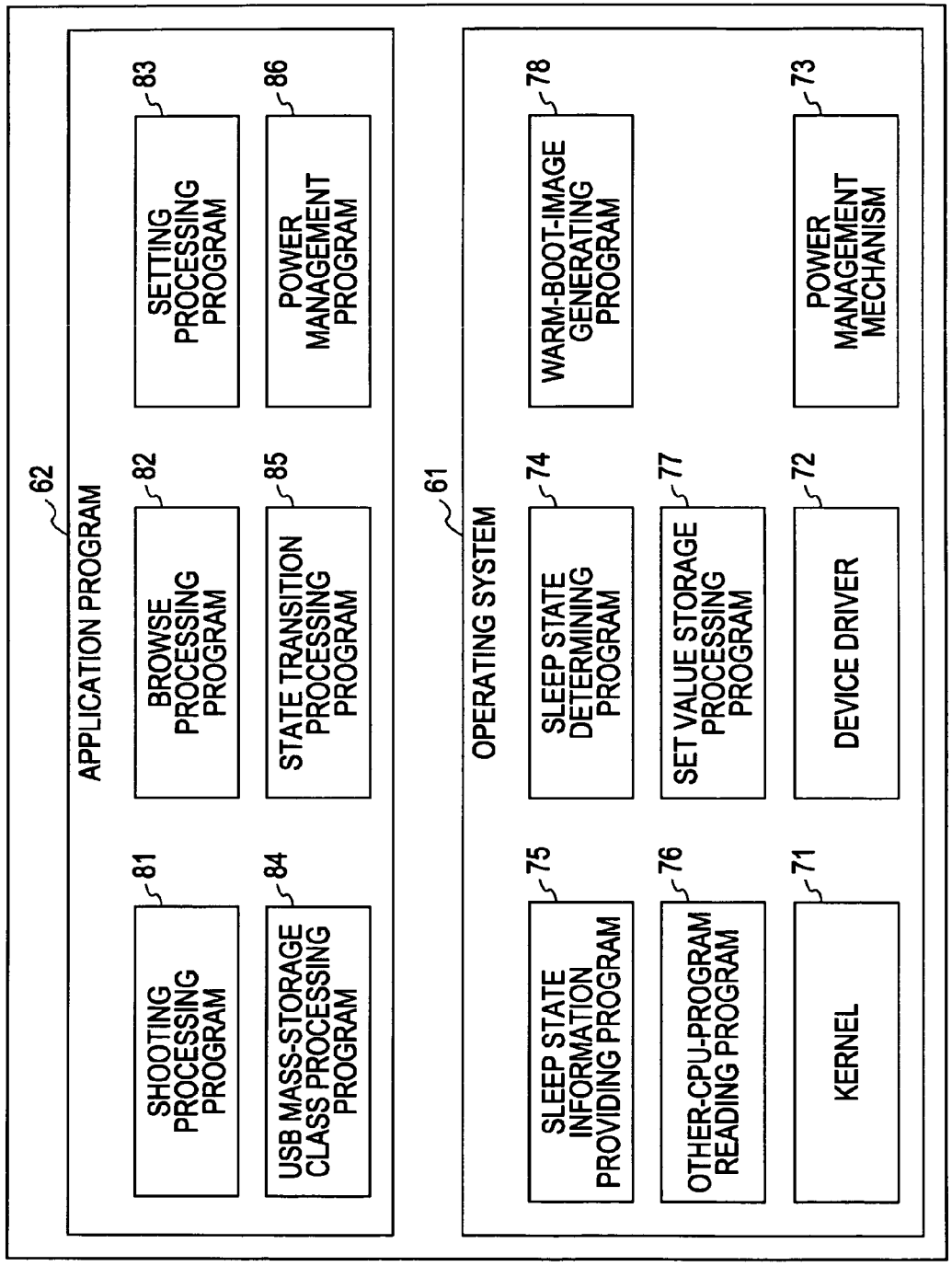
FIG. 2 is a block diagram showing the configuration of an operating system and an application program that are executed by a host CPU.

First, referring to FIG. 2, an operating system 61 and an application program 62 that are executed by the host CPU 11 will be described.

The host CPU 11 executes the operating system 61 and the application program 62.

The operating system 61 is an operating system such as Linux (registered trademark), and performs basic processing such as management of hardware. The application program 62 performs processing such as display of a subject image to be shot and browsing of shot images.

The operating system 61 includes a kernel 71, a device driver 72, a power management mechanism 73, a sleep state determining program 74, a sleep state information providing program 75, an other-CPU-program reading program 76, a set value storage processing program 77, and a warm-boot-image generating program 78.

The kernel 71 is the core part of the operating system 61, and provides basic functions of the operating system 61, such as the monitoring of the application program 62 and devices such as the mask ROM 13 through the general-purpose input/output unit 32, management of resources such as the SDRAM 29, the memory card 22, and the NAND-type flash memory 26, interrupt processing, or inter-process communication.

The device driver 72 controls devices such as the signal processing unit 16, the serial interface 19, the graphic controller 21, the memory card interface 23, the controller 25, the IDE interface 28, and the general-purpose input/output unit 32. Although the device driver 72 is essentially a program for individually controlling each of the signal processing unit 16 through the general-purpose input/output unit 32, the device driver 72 will herein be described as collectively controlling the signal processing unit 16 through the general-purpose input/output unit 32, without individual differentiation.

The power management mechanism 73 is an ACPI (advanced configuration and power interface) subsystem or the like, and manages the power so as to put the digital still camera to sleep in a suspend state, hibernation, or soft-off state, or to put the digital still camera into a working state from a sleep state in either the suspend, hibernation, or soft-off state.

The sleep state determining program 74 determines whether the digital still camera is to sleep in a suspend state or hibernation when the digital still camera goes to sleep.

The sleep state information providing program 75 supplies, when the digital still camera goes to sleep, sleep state information indicating the determined state of either the suspend state or hibernation to the embedded controller 33 via the serial interface 19.

The other-CPU-program reading program 76 loads, when the digital still camera goes to sleep, the operating system and application program of the real-time processing CPU 12 which are stored in the NAND-type flash memory 17, to the SDRAM 29.

Incidentally, in the following description, reading a program or data stored in the NAND-type flash memory 17 and loading the read program or data to the SDRAM 29 will be referred to as loading the program or data from the NAND-type flash memory 17 to the SDRAM 29.

The set value storage processing program 77 stores, when the digital still camera goes to sleep, set values required for a return performed when the digital still camera activates after the sleep, such as the shutter speed and exposure, zoom, the size of an image to be shot and compression ratio used for encoding, or the values of the internal registers of the host CPU 11.

The warm-boot-image generating program 78 generates a warm-boot image displayed immediately after activation when firmware, that is, the operating system 61 or the application program 62 is updated and activation is performed from a state in which power supply is stopped. The warm-boot-image generating program 78 stores the generated warm-boot image into the NAND-type flash memory 17.

The application program 62 includes a shooting processing program 81, a browse processing program 82, a setting processing program 83, a USB mass-storage class processing program 84, a state transition processing program 85, and a power management program 86.

The shooting processing program 81 controls display of a subject image to be shot on the LCD 20, image processing on a shot image, encoding and storage of image data obtained by shooting, and the like. That is, the shooting processing program 81 performs shooting processing.

The browse processing program 82 performs the processing of allowing the user to browse images, such as by displaying images on the LCD 20 on the basis of image data generated by shooting and stored in the NAND-type flash memory 26 or the memory card 22.

The setting processing program 83 performs various kinds of setting, including settings related to shooting such as the shutter speed, exposure, or zoom, or the size of an image to be shot, the mode of encoding, or the compression ratio used for encoding, the storage destination of image data, and the manner of display for image browsing.

The USB mass-storage processing program 84 performs USB mass-storage class processing for causing the digital still camera to operate as a recording device, when the other terminal of a cable whose one terminal is connected to equipment such as a personal computer is connected to the USB connection terminal 41.

The shooting processing program 81 through the USB mass-storage class processing program 84 perform necessary GUI processing in the shooting processing through the USB mass-storage class processing, respectively.

The state transition processing program 85 performs state transition processing of making a transition to a predetermined state among a plurality of states included in a working state. The working state will be described later in detail.

The power management program 86 is a power management program (Power Management Interface) provided by Linux (registered trademark) kernel, and manages power by issuing various kinds of command related to the state of power.

Incidentally, the operating system 61 may include the state transition processing program 85.

Figure 3:
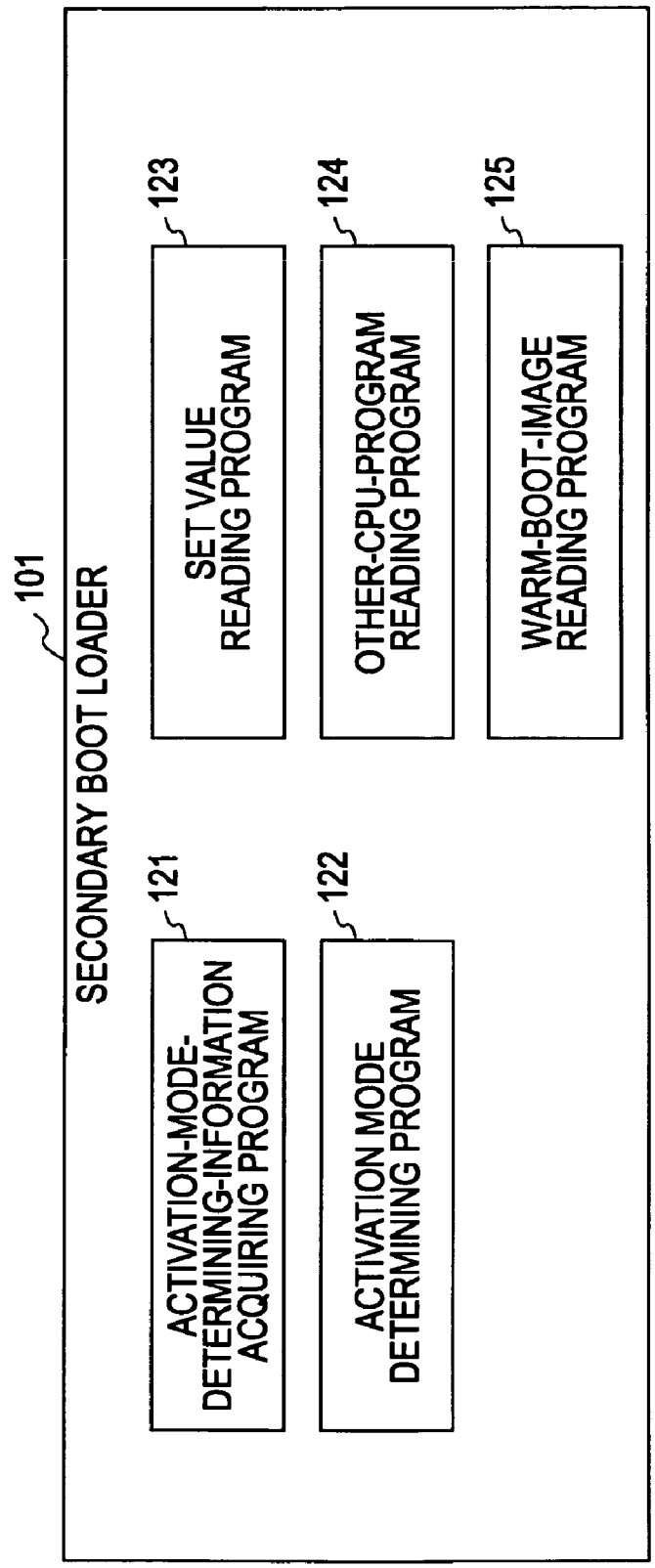
FIG. 3 is a block diagram showing the configuration of a secondary boot loader executed by a host CPU.

Next, referring to FIG. 3, description will be given of a secondary boot loader that is executed by the host CPU 11 when performing activation. At the time of activation, this secondary boot loader is loaded to the SDRAM 29 by the boot loader executed by the host CPU 11, and executed.

A secondary boot loader 101 is a program corresponding to "grub" or "lilo" used in a PC (Personal Computer), and controls the activation of the operating system 61 and application program 62.

The secondary boot loader 101 includes an activation-mode-determining-information acquiring program 121, an activation mode determining program 122, a set value reading program 123, an other-CPU-program reading program 124, and a warm-boot-image reading program 125.

The activation-mode-determining-information acquiring program 121 acquires from the embedded controller 33 activation mode determining information that is stored the embedded controller 33 in its internal memory. The activation mode determining information refers to information for determining the activation mode.

The activation mode includes a mode of performing activation by executing a program, which is a program that was stored in the SDRAM 29 in the working state immediately before entering sleep and which is stored in the SDRAM 29 in the suspend state, and a mode of performing activation by loading a warm-boot image, which is the image of a program that was stored in the SDRAM 29 in the working state immediately before entering sleep and which is stored in the NAND-type flash memory 17, to the SDRAM 29 and executing the warm-boot image, or the like.

Hereinafter, the mode of performing activation by executing a program, which is a program that was stored in the SDRAM 29 in the working state immediately before entering sleep and which is stored in the SDRAM 29 in the suspend state, will be referred to as a hot boot. Also, the mode of performing activation by loading a warm-boot image, which is the image of a program that was stored in the SDRAM 29 in the working state immediately before entering sleep and which is stored in the NAND-type flash memory 17, to the SDRAM 29 and executing the warm-boot image will be referred to as a warm boot.

Further, a mode of performing activation by opening the file of the operating system stored in the NAND-type flash memory 17 will be referred to as a cold boot.

As for the time required for activation, the time required for activation by a warm boot is long as compared with the time required for activation by a hot boot, and the time required for activation by a cold boot is extremely long as compared with the time required for activation by a warm boot. That is, it can be said that activation by a hot boot is extremely quick as compared with activation by a cold boot, activation by a warm boot is quick as compared with activation by a cold boot, and activation by a hot boot is quick as compared with activation by a warm boot.

Incidentally, activation by a hot boot or a warm boot is generally referred to as "resume".

The object of activation by a hot boot, a warm boot, or a cold boot is the digital still camera, the host CPU 11, or the operating system 61. Therefore, it can be said that the digital still camera is subjected to a hot boot, a warm boot, or a cold boot, the host CPU 11 is subjected to a hot boot, a warm boot, or a cold boot, or the operating system 61 is subjected to a hot boot, a warm boot, or a cold boot.

Next, activation mode determining information will be described. More specifically, activation mode determining information includes sleep state information and battery attachment/detachment information, and further includes activating-factor information.

The sleep state information is information indicating the determined sleep state when entering sleep. Incidentally, the sleep state information includes an image creation flag indicating whether or not to create a warm-boot image. For example, an image creation flag that is set (standing up) indicates that a warm-boot image is to be created, and an image creation flag that is cleared (not standing up) indicates that a warm-boot image is not to be created.

The battery attachment/detachment information indicates a history of attachment/detachment of the battery 35 in a sleep state.

The activating-factor information indicates an activating factor that serves as an activation trigger, such as the depression of the power button, the wireless LAN button, or the USB button of the input unit 31, connection of equipment to the USB connection terminal 41, or opening of the lens cap.

The activation-mode-determining-information acquiring program 121 stores the activation mode determining information acquired from the embedded controller 33 into a predetermined storage area of the SDRAM 29.

The activation mode determining program 122 determines the activation mode on the basis of the activation mode determining information.

The set value reading program 123 reads, when the digital still camera goes to sleep, the set values stored into the NAND-type flash memory 17 by the set value storage processing program 77.

The other-CPU-program reading program 124 loads, in the case of a warm boot or a cold boot, the operating system and application program of the real-time processing CPU 12 stored in the NAND-type flash memory 17 to the SDRAM 29.

The warm-boot image reading program 125 loads, in the case of a warm boot, the warm-boot image stored in the NAND-type flash memory 17 to the SDRAM 29.

Figure 4:
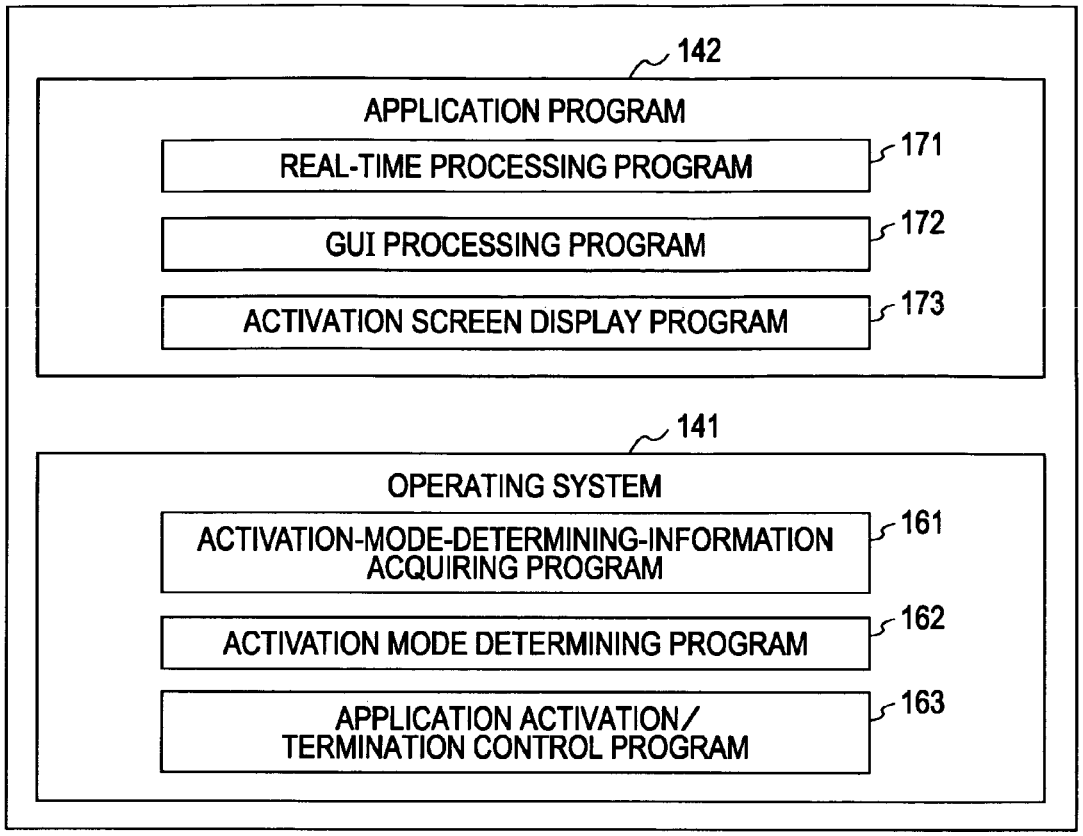
FIG. 4 is a block diagram showing the configuration of an operating system and an application program that are executed by a real-time processing CPU.

Next, an operating system 141 and an application program 142 executed by the real-time processing CPU 12 will be described with reference to FIG. 4.

The real-time processing CPU 12 executes the operating system 141 and the application program 142.

The operating system 141 is a so-called real-time operating system such as μITRON, and performs various kinds of basic processing. The application program 142 performs real-time control processing with respect to the unillustrated optical system, the CCD 14, the analog front end 15, and the signal processing unit 16, which is required when shooting a subject.

The operating system 141 includes an activation-mode-determining-information acquiring program 161, an activation mode determining program 162, and an application activation/termination control program 163.

The activation-mode-determining-information acquiring program 161 reads, when performing activation, the activation mode determining information stored by the activation-mode-determining-information acquiring program 121 from a predetermined storage area of the SDRAM 29, thereby acquiring the activation mode determining information.

The activation mode determining program 162 determines the mode of activation on the basis of activation mode determining information. In this case, the activation mode determining program 162 determines the mode of activation to be the same mode of activation as the mode of activation determined by the activation mode determining program 122, on the basis of the activation mode determining information shared with the activation mode determining program 122.

The application activation/termination control program 163 controls, when performing activation, the activation and termination of various kinds of processing of the application program 142 on the basis of activating-factor information included in the activation mode determining information.

The application program 142 includes a real-time processing program 171, a GUI processing program 172, and an activation screen display program 173.

The real-time processing program 171 controls the unillustrated optical system, the CCD 14, the analog front end 15, and the signal processing unit 16 in real time.

The GUI processing program 172 performs user interface processing for acquiring a user's instruction from the input unit 31, which is shared by the real-time processing CPU 12 with the host CPU 11. The GUI processing program 172 performs a part of the GUI processing performed by each of the shooting processing program 81 through the USB mass-storage class processing program 84, for example, limited GUI processing with respect to a set value whose setting may sometimes be requested immediately after activation, such as a set value for the shutter speed, exposure, or zoom.

The activation screen display program 173 causes the LCD 20 to display an activation screen indicating activation, when performing activation.

Incidentally, the application program 142 may include the application activation/termination control program 163.

Figure 5:
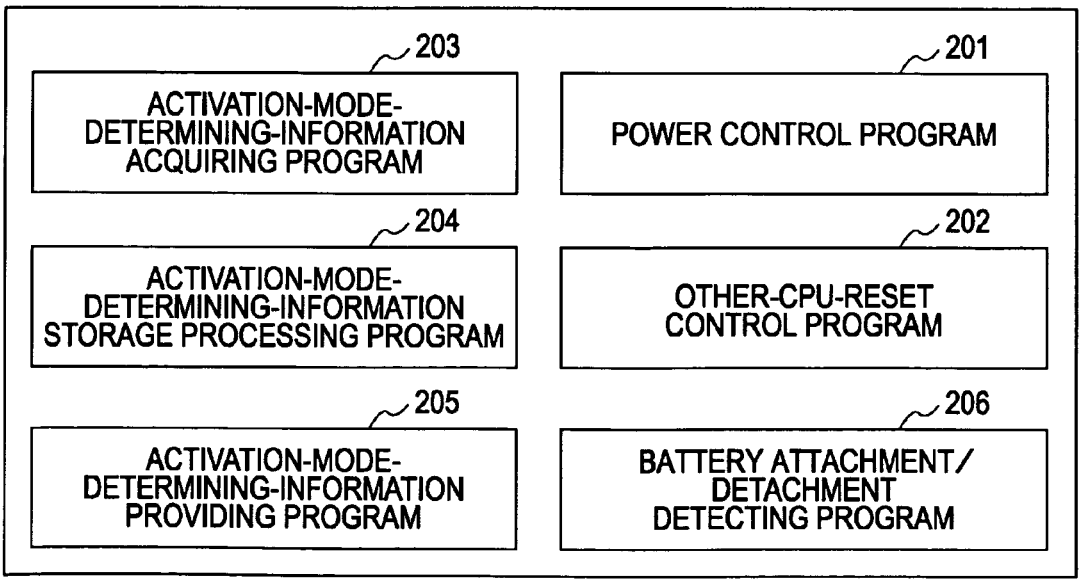
FIG. 5 is a block diagram showing the configuration of programs executed by an embedded controller.

Next, programs executed by the embedded controller 33 will be described. FIG. 5 is a diagram showing the programs executed by the embedded controller 33. The embedded controller 33 executes a power control program 201, an other-CPU reset control program 202, an activation-mode-determining-information acquiring program 203, an activation-mode-determining-information storage processing program 204, an activation-mode-determining-information providing program 205, and a battery attachment/detachment detecting program 206.

The power control program 201 controls the supply of electric power to the individual units of the digital still camera by controlling the DC-DC converter 34.

The other-CPU-program control program 202 controls the reset of the host CPU 11 and the cancellation thereof.

The activation-mode-determining-information acquiring program 203 acquires activation mode determining information.

More specifically, when the digital still camera goes to sleep, the activation-mode-determining-information acquiring program 203 acquires sleep state information of activation mode determining information by receiving the sleep state information transmitted from the sleep state information providing program 75.

Also, the activation-mode-determining-information acquiring program 203 acquires the detection result of attachment/detachment of the battery 35 from the battery attachment/detachment detecting program 206. The activation-mode-determining-information acquiring program 203 generates battery attachment/detachment information corresponding to the detection result of attachment/detachment of the battery 35. Further, the activation-mode-determining-information acquiring program 203 generates activating-factor information indicating an activation trigger such as depression of the power button, the wireless LAN button, or the USB button, or opening of the lens cap, in accordance with a signal that is supplied from the input unit 31 and indicates depression of the power button, the wireless LAN button, or the USB button, or opening/closing of the lens cap.

The activation-mode-determining-information storage processing program 204 stores the acquired activation mode determining information into an internal memory of the embedded controller 33. That is, the activation-mode-determining-information storage processing program 204 stores the received sleep state information, the generated battery attachment/detachment information, or the generated activating-factor information into the internal memory of the embedded controller 33.

The activation-mode-determining-information providing program 205 provides the activation mode determining information stored in the internal memory of the embedded controller 33 to the host CPU 11, via the serial interface 19 in response to a request from the host CPU 11.

The battery attachment/detachment detecting program 206 detects attachment/detachment of the battery 35 by detecting the output voltage of the DC-DC converter 34.

Figure 6:
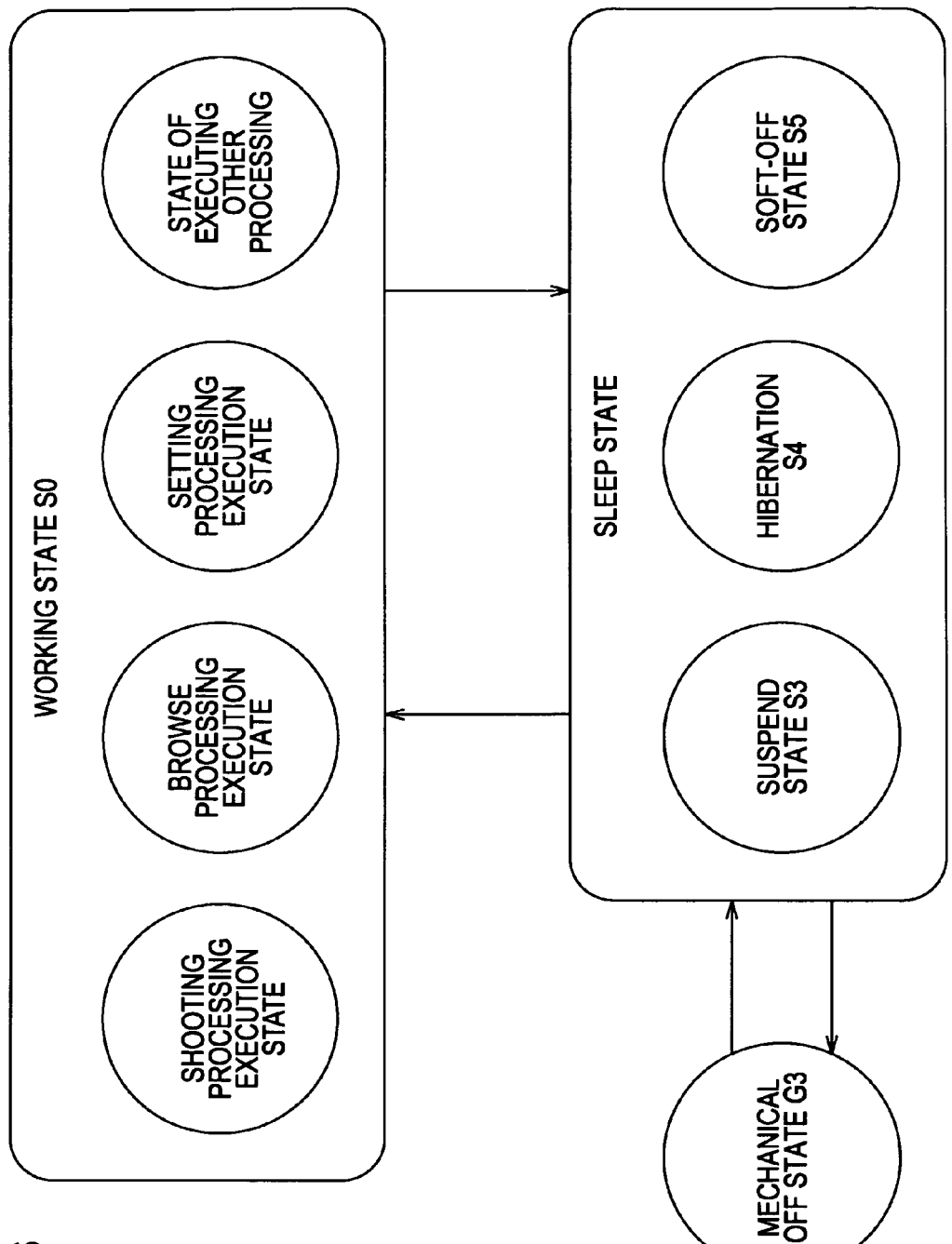
FIG. 6 is a diagram illustrating states of a digital still camera.

Next, referring to FIGS. 6 through 9, the state of the digital still camera will be described. As shown in FIG. 6, the state of the digital still camera is one of a mechanical off state G3, a suspend state S3, hibernation S4, a soft-off state S5, a shooting processing execution state, a browse processing execution state, a setting processing execution state, or a state of executing other processing.

In the shooting processing execution state, the shooting processing program 81 is being executed by the host CPU 11. In the browse processing execution state, the browse processing program 82 is being executed by the host CPU 11. In the setting processing execution processing, the setting processing program 83 is being executed by the host CPU 11.

In the state of executing other processing, the USB mass-storage class processing program 84 is being executed by the host CPU 11. Alternatively, in the state of executing other processing, although the application program 62 is being executed by the host CPU 11, neither of the shooting processing program 81, the browse processing program 82, the setting processing program 83, and the USB mass-storage processing program 84 is being executed.

The suspend state S3, the hibernation S4, and the soft-off state S5 will be referred to as sleep state. Also, the shooting processing execution state, the browse processing execution state, the setting processing execution state, and the state of executing other processing will be referred to working state S0.

FIG. 7 is a diagram showing the presence/absence of power supply to the host CPU 11, the SDRAM 29, or the embedded controller 33 in each of the working state S0, suspend state S3, hibernation S4, soft-off state S5, and mechanical off state G3.

"ON" in FIG. 7 indicates that power is being supplied, and "OFF" indicates that supply of power is being stopped, that is, power is not being supplied.

In the working state S0, power is supplied from the DC-DC converter 34 to all of the host CPU 11, the SDRAM 29, and the embedded controller 33.

In the suspend state S3, the supply of power from the DC-DC converter 34 to the host CPU 11 is stopped, and power is supplied from the DC-DC converter 34 to the SDRAM 29 and the embedded controller 33. Since the SDRAM 29 refreshes stored data (program) by itself when supplied with power due to its self-refresh function, in the suspend state S3, the SDRAM 29 maintains stored program and data.

In the hibernation S4 and the soft-off state S5, the supply of power from the DC-DC converter 34 to the host CPU 11 and the SDRAM 29 is stopped, and power is supplied from the DC-DC converter 34 to the embedded controller 33.

Since the hibernation S4 and the soft-off state S5 are the same state electrically in the digital still camera, in the following description, the hibernation S4 and the soft-off state S5 will not be differentiated from each other.

In the mechanical off state G3, the supply of power from the DC-DC converter 34 to the host CPU 11, the SDRAM 29, and the embedded controller 33 is stopped. However, power is supplied to the embedded controller 33 from the battery 36. Thus, the operation of the real-time clock (RTC) built in the embedded controller 33 is retained.

Incidentally, like the power to the host CPU 11, the power to the real-time processing CPU 12 is supplied in the working state S0, and its supply is stopped in the suspend state S3, the hibernation S4, the soft-off state S5, and the mechanical off state G3.

Figure 8:
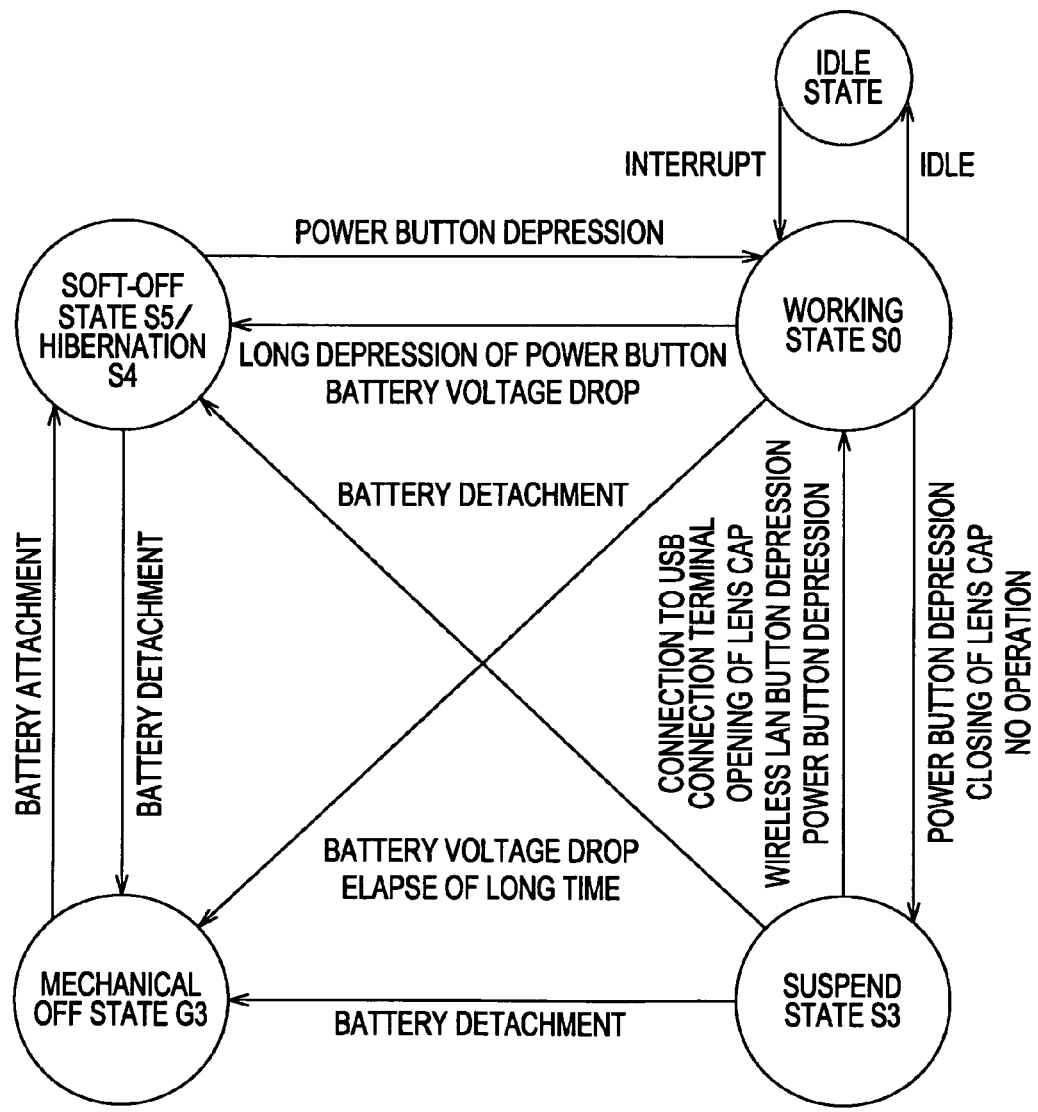
FIG. 8 is a diagram showing the transition of states of a digital still camera.

FIG. 8 is a diagram showing the transition of states. In the mechanical off state G3, when the battery 35 is attached, the state of the digital still camera transitions to the hibernation S4 (soft-off state S5).

In the hibernation S4 (soft-off state S5), when the battery 35 is detached, the state of the digital still camera transitions to the mechanical off state G3.

In the hibernation S4 (soft-off state S5), when the power button of the input unit 31 is depressed, the state of the digital still camera transitions to the working state S0. Conversely, when, in the activate state S0, the power button is long-depressed, that is, depressed continuously for a time longer than a predetermined time, the state of the digital still camera transitions to the hibernation S4 (soft-off state S5).

In the working state S0, when the power button is depressed, the lens cap is closed, or no user operation is performed for a time longer than a predetermined time (i.e. no operation), the state of the digital still camera transitions to the suspend state S3.

In the suspend state S3, when the power button is depressed, the wireless LAN button of the input unit 31 is depressed, the lens cap is opened, or the other terminal of a cable whose one terminal is connected to another equipment is connected to the USB connection terminal 41, the state of the digital still camera transitions to the working state S0.

In the suspend state S3, when the voltage of the battery 35 becomes lower than a predetermined threshold, or a predetermined length of time, that is, a long time has elapsed since the transition to the suspend state S3, the state of the digital still camera transitions to the hibernation S4 (soft-off state S5).

Also, in the suspend state S3, when the battery 35 is detached, the state of the digital still camera transitions to the mechanical off state G3. Likewise, in the working state S0, when the battery 35 is detached, the state of the digital still camera transitions to the mechanical off state G3.

Incidentally, when, in the working state S0, no processing is executed for a fixed period of time (when in idle), the state of the digital still camera transitions to a so-called idle state in which the frequency of the clock of the host CPU 11 is dropped. In the idle state, an interrupt occurs every fixed period of time, and the state of the digital still camera becomes the working state S0 every fixed period of time.

Figure 9:
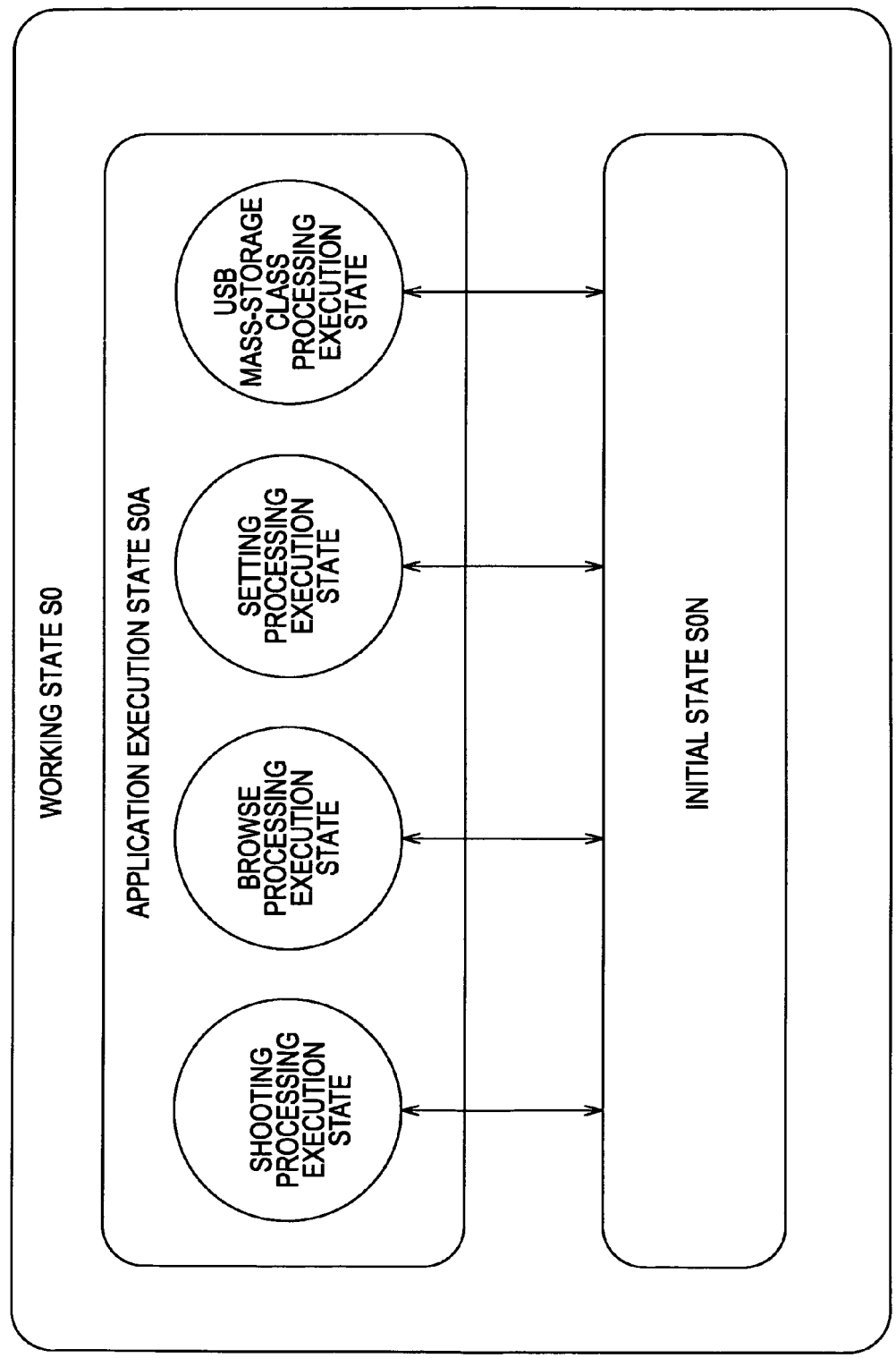
FIG. 9 is a diagram illustrating states of a digital still camera.

Referring to FIG. 9, the working state S0 will be described in detail. The working state S0 includes, in addition to the shooting processing execution state, the browse processing execution state, and the setting processing execution state, a USE mass-storage class processing execution state corresponding to the state of executing other processing, and an initial state SON.

In the USB mass-storage class processing execution state, the USB mass-storage class processing program 84 is being executed by the host CPU 11.

The initial state SON is a state in which the execution of application processing is inhibited. Although the application program 62 is being executed by the host CPU 11 in the initial state SON, neither of the shooting processing program 81, the browse processing program 82, the setting processing program 83, and the USB mass-storage processing program 84 is executed.

A transition can be made from the initial state S0N to either the shooting processing execution state, the browse processing execution state, the setting processing execution state, or the USB mass-storage class processing execution state. Likewise, a transition can be made to the initial state S0N from the shooting processing execution state, the browse processing execution state, the setting processing execution state, or the USB mass-storage class processing execution state.

However, a direct transition cannot be made from the shooting processing execution state to the browse processing execution state, the setting processing execution state, or the USB mass-storage class processing execution state, nor can a direct transition be made from the browse processing execution state to the shooting processing execution state, the setting processing execution state, or the USB mass-storage class processing execution state. A direct transition cannot be made from the setting processing execution state to the browse processing execution state, the shooting processing execution state, or the USB mass-storage class processing execution state, nor can a direct transition be made from the USB mass-storage class processing execution state to the shooting processing execution state, the browse processing execution state, or the setting processing execution state.

That is, no direct transition can be made between the shooting processing execution state, the browse processing execution state, the setting processing execution state, and the USB mass-storage class processing execution state.

Next, referring to FIGS. 10 through 12, an overview of the procedure of activation processing will be described.

First, description will be given of activation by a warm boot whereby activation is done by loading a warm-boot image, which is the image of a program that was stored in the SDRAM 29 in the working state S0 before entering sleep and which is stored in the NAND-type flash memory 17, to the SDRAM 29 and executing the warm-boot image.

Figure 10:
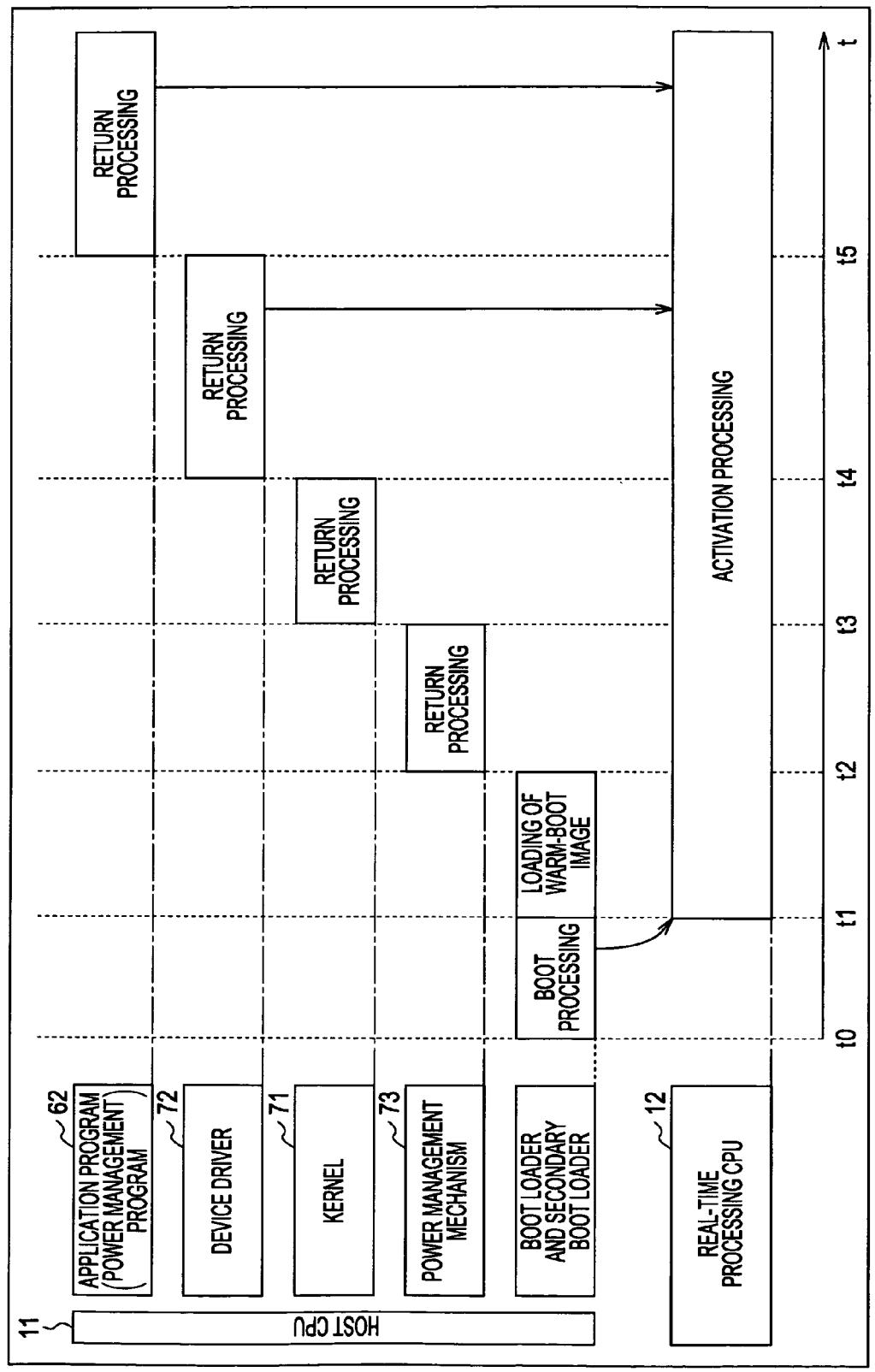
FIG. 10 is a diagram illustrating an overview of the procedure of activation processing by a warm boot.

FIG. 10 is a diagram showing the procedure of activation processing by a warm boot. When, at time t0, the reset of the host CPU 11 is cancelled, the host CPU 11 starts execution of a boot loader stored at a predetermined address in the mask ROM 13. The host CPU 11 executing the boot loader loads the secondary boot loader stored in the NAND-type flash memory 17 to the SDRAM 29. Due to a jump instruction for the boot loader, the host CPU 11 starts execution of the secondary boot loader.

The host CPU 11 executing the secondary boot loader loads the operating system 141 and the application program 142 executed by the real-time processing CPU 12, which are stored in the NAND-type flash memory 17, to the SDRAM 29.

Then, the host CPU 11 executing the secondary boot loader cancels the reset of the real-time processing CPU 12.

At time t1, the real-time processing CPU 12 for which the reset has been cancelled starts execution of program's instructions from the predetermined address in the SDRAM 29, thereby starting execution of the operating system 141.

The host CPU 11 executing the secondary boot loader loads the warm-boot image stored in the NAND-type flash memory 17 to the SDRAM 29.

When loading of the warm-boot image to the SDRAM 29 is completed, at time t2, the host CPU 11 starts execution of the power management mechanism 73 included in the loaded warm-boot image. The host CPU 11 executing the power management mechanism 73 detects the state of the power source including the DC-DC converter 34 and the battery 35, and performs return processing such as correcting internal parameters in accordance with the detected state of the power source.

When the return processing of the power management mechanism 73 is completed, at time t3, the host CPU 11 starts execution of the kernel 71 included in the loaded warm-boot image. The host CPU 11 executing the kernel 71 detects the occupancy state of the storage space in the SDRAM 29 or the like, and performs return processing such as correcting parameters for the management process of resources such as the SDRAM 29.

When the return processing of the kernel 71 is completed, at time t4, the host CPU 11, starts execution of the return processing of the device driver 72 included in the loaded warm-boot image. That is, the host CPU 11 detects the state of each of devices such as the signal processing unit 16, the serial interface 19, the graphic controller 21, the memory card interface 23, the controller 25, the IDE interface 28, and the general-purpose input/output unit 32, and performs return processing such as correcting the parameters of the device driver 72 in accordance with the detected device state.

When the return processing of the device driver 72 is completed, the host CPU 11 notifies the real-time processing CPU 12 of the fact that the return processing of the device driver 72 is completed.

When the real-time processing CPU 12 receives from the host CPU 11 a notification indicating that the return processing of the device driver 72 is completed, communication between the real-time control processing executed by executing the real-time processing program 171, and the processing in the host CPU 11 is started.

Also, when the return processing of the device driver 72 is completed, at time t5, the host CPU 11 starts execution of the return processing of the device driver 72 included in the loaded warm-boot image. The host CPU 11 performs the return processing of the application program 62 such as setting a set value for the shutter speed, exposure, zoom, or the like.

When the return processing of the application program 62 is completed, the host CPU 11 notifies the real-time processing CPU 12 of the fact that the return processing of the application program 62 is completed. The power management program 86 of the application program 62 starts monitoring of the state of the power source by, for example, acquiring parameters indicating the state of the power source from the power management mechanism 73.

Figure 11:
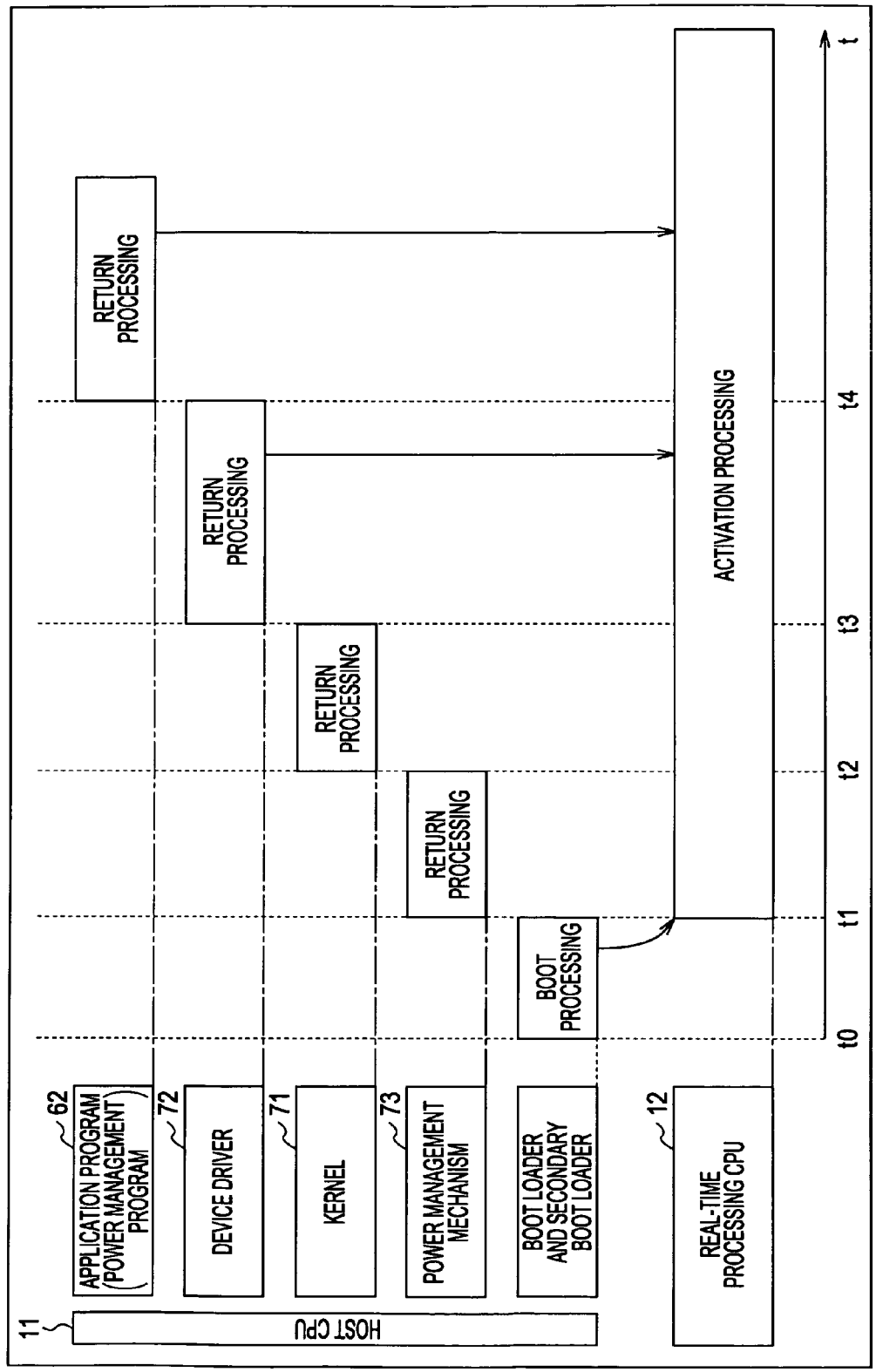
FIG. 11 is a diagram illustrating an overview of the procedure of activation processing by a hot boot.

FIG. 11 is a diagram showing the procedure of activation processing by a hot boot whereby activation is performed by executing a program which was stored in the SDRAM 29 in the working state S0 immediately before entering sleep and which is stored in the SDRAM 29 in the suspend state S3.

Incidentally, in the suspend state S3 and after the start of activation processing by a hot boot, the SDRAM 29 maintains the storage of the operating system 61, application program 62, and operating system 41 that were stored in the working state S0 immediately before entering sleep.

When, at time t0, the reset of the host CPU 11 is cancelled, the host CPU 11 starts execution of a boot loader stored at a predetermined address in the mask ROM 13. The host CPU 11 executing the boot loader loads the secondary boot loader stored in the NAND-type flash memory 17 to the SDRAM 29. Due to a jump instruction for the boot loader, the host CPU 11 starts execution of the secondary boot loader.

As described above, in the suspend state S3 and after the start of activation processing by a hot boot, the SDRAM 29 maintains the storage of the operating system 141 and application program 142. Thus, in the activation processing by a hot boot, there is no need for the host CPU 11 executing the secondary boot loader to load the operating system 141 and the application program 142 to the SDRAM 29 again.

The host CPU 11 executing the secondary boot loader cancels the reset of the real-time processing CPU 12.

At time t1, the real-time processing CPU 12 for which the reset has been cancelled starts execution of program's instructions from a predetermined address in the SDRAM 29, thereby starting execution of the operating system 141.

After the reset of the real-time processing CPU 12 is cancelled, the host CPU 11 starts execution of the power management mechanism 73 stored in the SDRAM 29. The host CPU 11 executing the power management mechanism 73 detects the state of the power source including the DC-DC converter 34 and the battery 35, and performs return processing such as correcting internal parameters in accordance with the detected state of the power source.

When the return processing of the power management mechanism 73 is completed, at time t2, the host CPU 11 starts execution of the kernel 71 stored in the SDRAM 29. The host CPU 11 executing the kernel 71 detects the occupancy state of the storage space in the SDRAM 29 or the like, and performs return processing such as correcting parameters for the management process of resources such as the SDRAM 29.

When the return processing of the kernel 71 is completed, at time t3, the host CPU 11 starts execution of the return processing of the device driver 72 stored in the SDRAM 29. That is, the host CPU 11 detects the state of each of devices such as the signal processing unit 16, the serial interface 19, the graphic controller 21, the memory card interface 23, the controller 25, the IDE interface 28, and the general-purpose input/output unit 32, and performs return processing such as correcting the parameters of the device driver 72 in accordance with the detected device state.

When the return processing of the device driver 72 is completed, the host CPU 11 notifies the real-time processing CPU 12 of the fact that the return processing of the device driver 72 is completed.

When the real-time processing CPU 12 receives from the host CPU 11 a notification indicating that the return processing of the device driver 72 is completed, communication between the real-time control processing executed by executing the real-time processing program 171, and the processing in the host CPU 11 is started.

Also, when the return processing of the device driver 72 is completed, at time t4, the host CPU 11 starts execution of return processing of the application program 62 stored in the SDRAM 29. The host CPU 11 performs the return processing of the application program 62 such as setting a set value for the shutter speed, exposure, zoom, or the like.

When the return processing of the application program 62 is completed, the host CPU 11 notifies the real-time processing CPU 12 of the fact that the return processing of the application program 62 is completed. The power management program 86 of the application program 62 starts monitoring of the state of the power source by, for example, acquiring parameters indicating the state of the power source from the power management mechanism 73.

As described above, in the activation processing by a hot boot, it is unnecessary to perform such processing as reading a warm-boot image from the NAND-type flash memory 17, and loading the warm-boot image to the SDRAM 29, thus allowing activation to be performed more quickly in comparison to the activation processing by a warm boot.

Next, description will be given of a cold boot, which is a mode of activation executed in a factory prior to shipping a digital still camera or executed when updating so-called firmware, and in which activation is performed by opening the operating system 61 and the application program 62 that are stored in the NAND-type flash memory 17.

Figure 12:
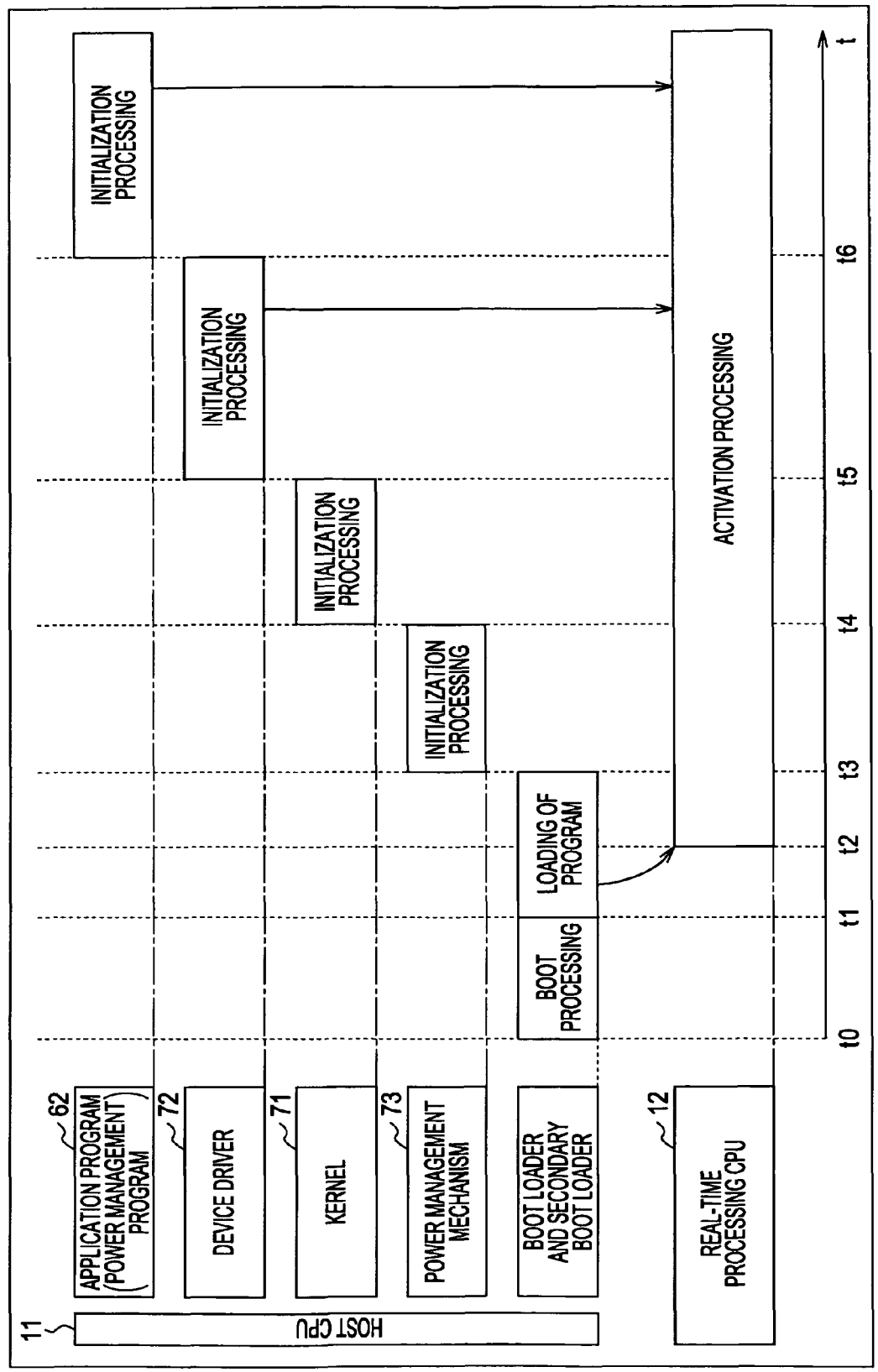
FIG. 12 is a diagram illustrating an overview of the procedure of activation processing by a cold boot.

FIG. 12 is a diagram showing the procedure of activation processing by a cold boot.

When, at time t0, the reset of the host CPU 11 is cancelled, the host CPU 11 starts execution of a boot loader stored at a predetermined address in the mask ROM 13. The host CPU 11 executing the boot loader loads the secondary boot loader stored in the NAND-type flash memory 17 to the SDRAM 29. Due to a jump instruction for the boot loader, the host CPU 11 starts execution of the secondary boot loader.

At time t1, the host CPU 11 executing the secondary boot loader starts loading of the operating system 141 and the application program 142, which are stored in the NAND-type flash memory 17, to the SDRAM 29.

When the loading of the operating system 141 and the application program 142 executed by the real-time processing CPU 12 to the SDRAM 29 is completed, the host CPU 11 executing the secondary boot loader cancels the reset of the real-time processing CPU 12.

At time t2, the real-time processing CPU 12 for which the reset has been cancelled starts execution of program's instructions from a predetermined address in the SDRAM 29, thereby starting execution of the operating system 141.

Further, the host CPU 11 executing the secondary boot loader loads the operating system 61 and the application program 62 stored in the NAND-type flash memory 17 to the SDRAM 29.

When loading of the operating system 61 and the application program 62 to the SDRAM 29 is completed, at time t3, the host CPU 11 starts execution of the power management mechanism 73 loaded to the SDRAM 29. The host CPU 11 executing the power management mechanism 73 detects the state of the power source including the DC-DC converter 34 and the battery 35, and performs initialization processing such as initializing internal parameters in accordance with the detected state of the power source.

When the initialization processing of the power management mechanism 73 is completed, at time t4, the host CPU 11 starts execution of the kernel 71 loaded to the SDRAM 29. The host CPU 11 executing the kernel 71 detects the size (address range) of the storage space in the SDRAM 29 or the like, and performs initialization processing such as initializing parameters for the management process of resources such as the SDRAM 29.

When the initialization processing of the kernel 71 is completed, at time t5, the host CPU 11 starts the initialization processing of the device driver 72 loaded to the SDRAM 29. That is, the host CPU 11 detects each of devices such as the signal processing unit 16, the serial interface 19, the graphic controller 21, the memory card interface 23, the controller 25, the IDE interface 28, and the general-purpose input/output unit 32, and performs initialization processing such as initializing the parameters of the device driver 72 in accordance with the detected device.

When the initialization processing of the device driver 72 is completed, the host CPU 11 notifies the real-time processing CPU 12 of the fact that the initialization processing of the device driver 72 is completed.

When the real-time processing CPU 12 receives from the host CPU 11 a notification indicating that the initialization processing of the device driver 72 is completed, communication between the real-time control processing executed by executing the real-time processing program 171, and the processing in the host CPU 11 is started.

Also, when the initialization processing of the device driver 72 is completed, at time t6, the host CPU 11 starts initialization processing of the application program 62 loaded to the SDRAM 29. The host CPU 11 performs the initialization processing of the application program 62, such as setting various parameters used for shooting processing or browse processing to default values.

When the initialization processing of the application program 62 is completed, the host CPU 11 notifies the real-time processing CPU 12 of the fact that the initialization processing of the application program 62 is completed. The power management program 86 of the application program 62 starts monitoring of the state of the power source by, for example, acquiring parameters indicating the state of the power source from the power management mechanism 73.

Further, the host CPU 11 generates a warm-boot image, and stores the generated warm-boot image into the NAND-type flash memory 17.

In this way, at the time of updating of firmware or the like, processing by a cold boot is executed, and the warm-boot image stored in the NAND-type flash memory 17 is updated.

Incidentally, the host CPU 11 executing the operating system 61 whose initialization is completed may load the application program 62 stored in the NAND-type flash memory 17 to the SDRAM 29.

Figure 13:
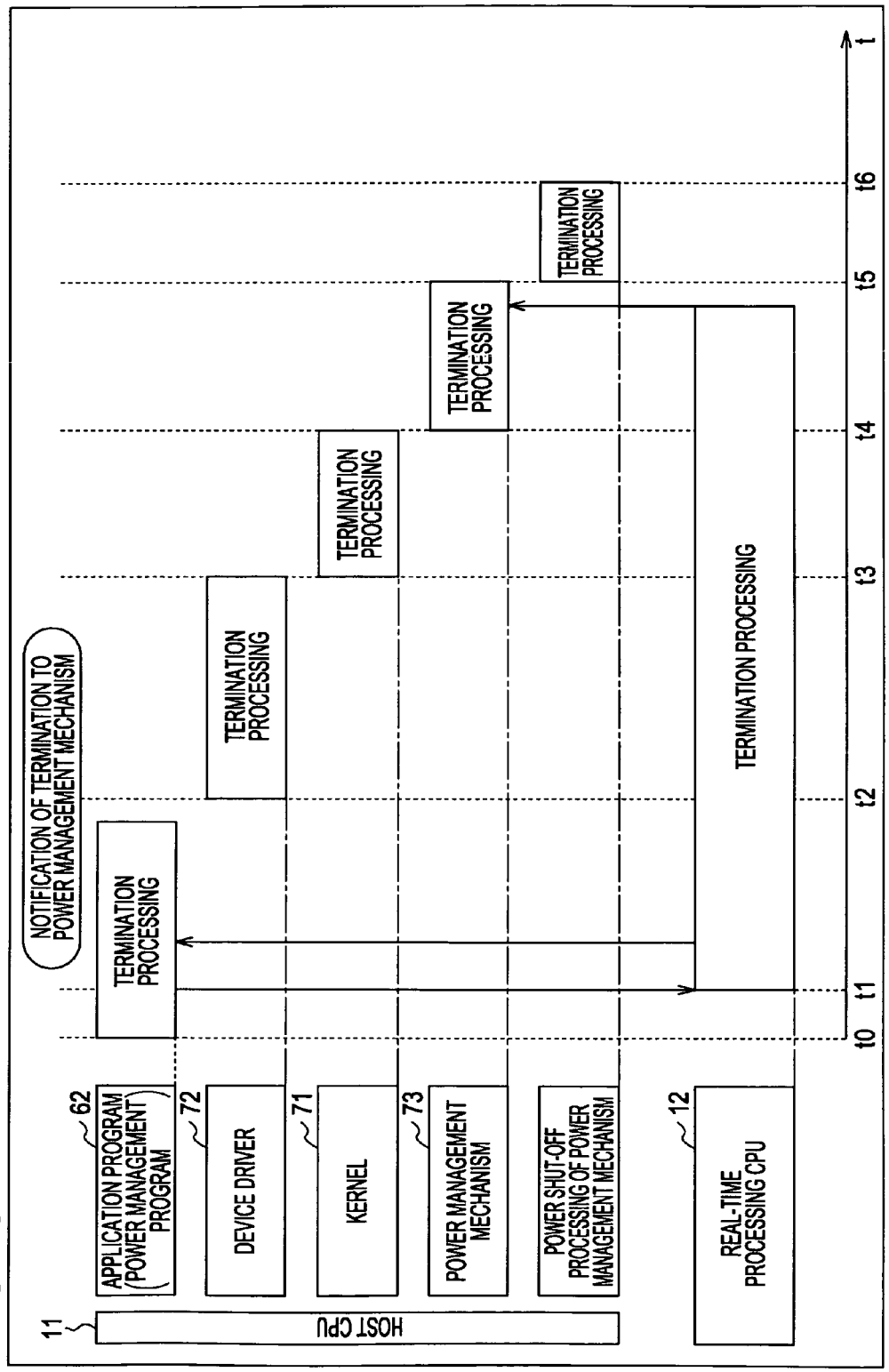
FIG. 13 is a diagram illustrating an overview of the procedure of sleep processing.

Next, referring to FIG. 13, description will be given of an overview of the procedure of sleep processing for making a transition from the working state S0 to a sleep state.

When the start of sleep processing is instructed at time t0, the host CPU 11 executing the application program 62 causes the state to transition to the initial state SON before transition to a sleep state. The host CPU 11 executing the application program 62 determines whether a transition is to be made to the suspend state S3 or the hibernation S4.

Also, the host CPU 11 executing the application program 62 executes termination processing such as closing the file that stores data of shot images.

Further, at time t1, the host CPU 11 executing the application program 62 notifies the real-time processing CPU 12 of the termination.

Then, the real-time processing CPU 12 starts termination processing such as returning the lens constituting the unillustrated optical system to the end position.

Also, the power management program 86 of the application program 62 issues a command instructing a transition to the suspend state S3 or the hibernation S4 thus determined, thereby notifying the power management mechanism 73 of the termination.

When the termination processing by the host CPU 11 executing the application program 62 is completed, at time t2, the host CPU 11 starts termination processing of the device driver 72, such as terminating the process for controlling each of devices such as the signal processing unit 16, the serial interface 19, the graphic controller 21, the memory card interface 23, the controller 25, the IDE interface 28, and the general-purpose input/output unit 32.

When the termination processing of the device driver 72 is completed, at time t3, the host CPU 11 starts termination processing of the kernel 71 for completing a predetermined process such as the monitoring of the application program 62 and devices, management of resources such as the SDRAM 29, interrupt processing, or inter-process communication.

When the termination processing of the kernel 71 is completed, at time t4, the host CPU 11 starts termination processing of the power management mechanism 73 such as setting parameters for a sleep state.

When notified of the completion of termination processing from the real-time processing CPU 12, at time t5, the host CPU 11 executing the power management mechanism 73 requests the embedded controller 33 to stop (shut off) the supply of power, via the serial interface 19. When requested to stop (shut off) the supply of power from the host CPU 11, at time t6, in the case of a transition to the suspend state S3, the embedded controller 33 causes the DC-DC converter 34 to stop (shut off) the supply of power to the host CPU 11 and the real-time processing CPU 12 while keeping supply of power to the SDRAM 29 as it is, and in the case of a transition to the hibernation S4, the embedded controller 33 causes the DC-DC converter 34 to stop (shut off) the supply of power to the SDRAM 29, the host CPU 11, and the real-time processing CPU 12.

In this way, a transition can be made to the suspend state S3 or the hibernation S4 to enter sleep.

Next, the details of activation processing by a warm boot, a hot boot, and a cold boot will be described.

Figure 14:
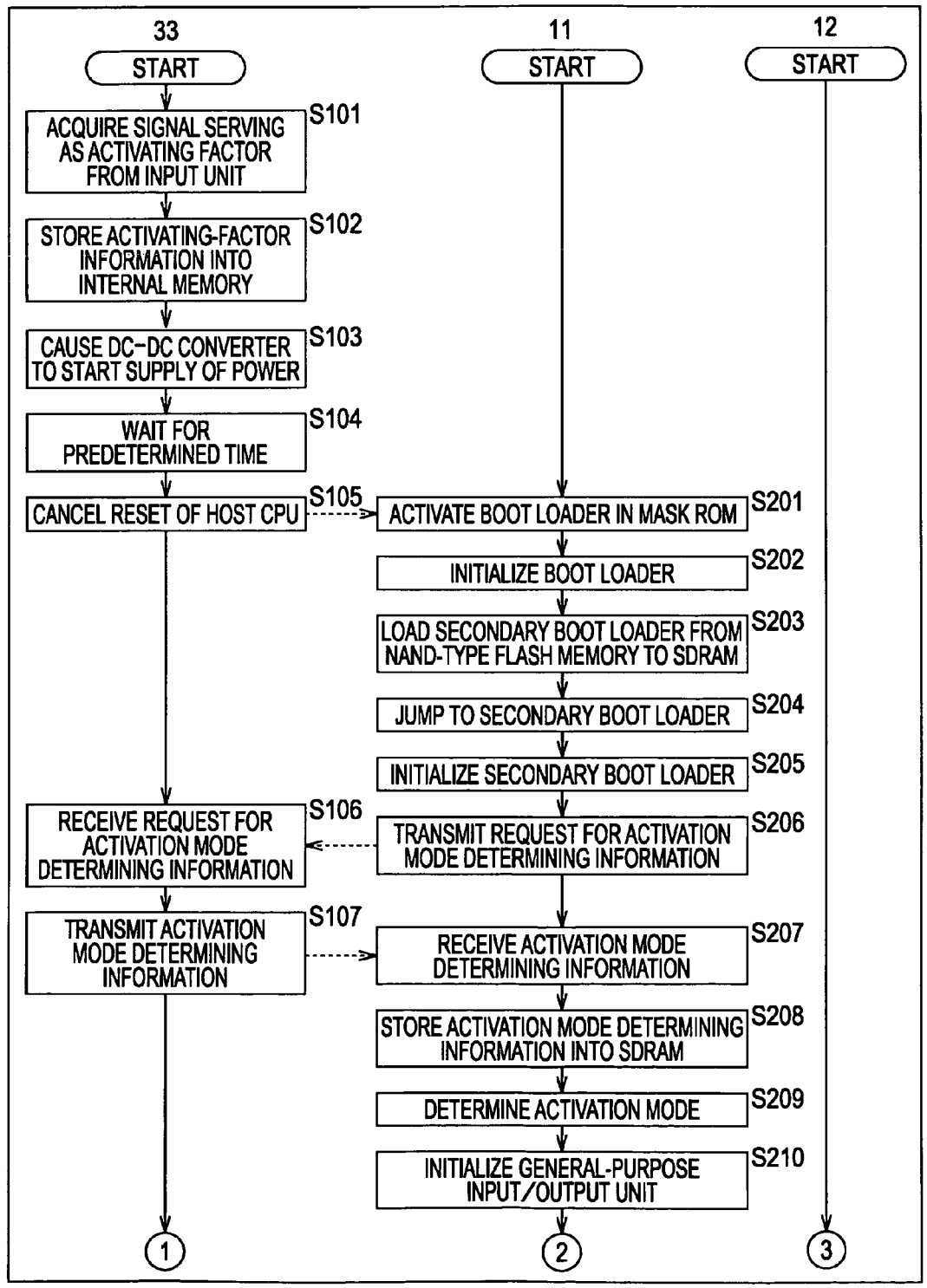
FIG. 14 is a flowchart illustrating the details of activation processing by a warm boot.
Figure 15:
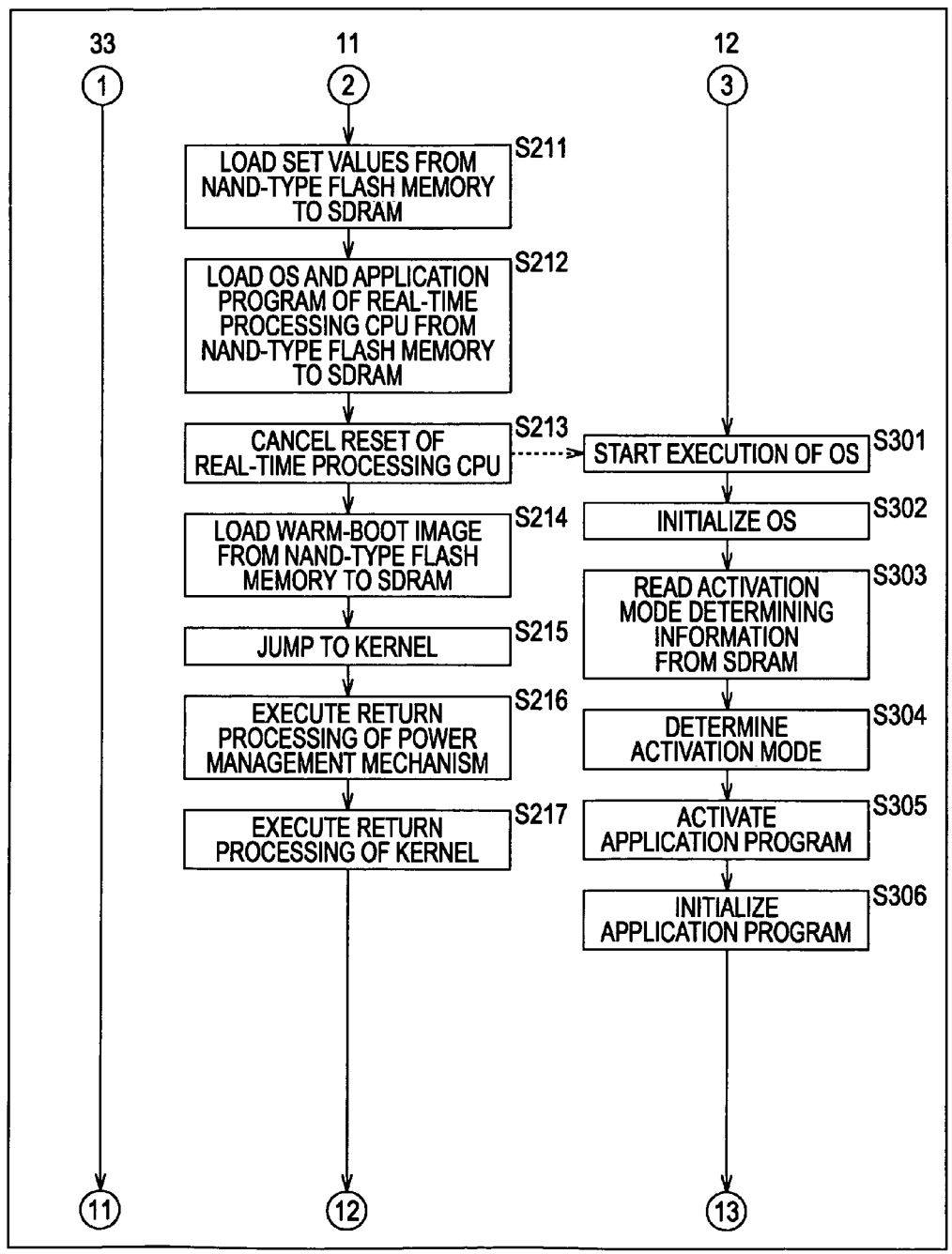
FIG. 15 is a flowchart illustrating the details of activation processing by a warm boot.
Figure 16:
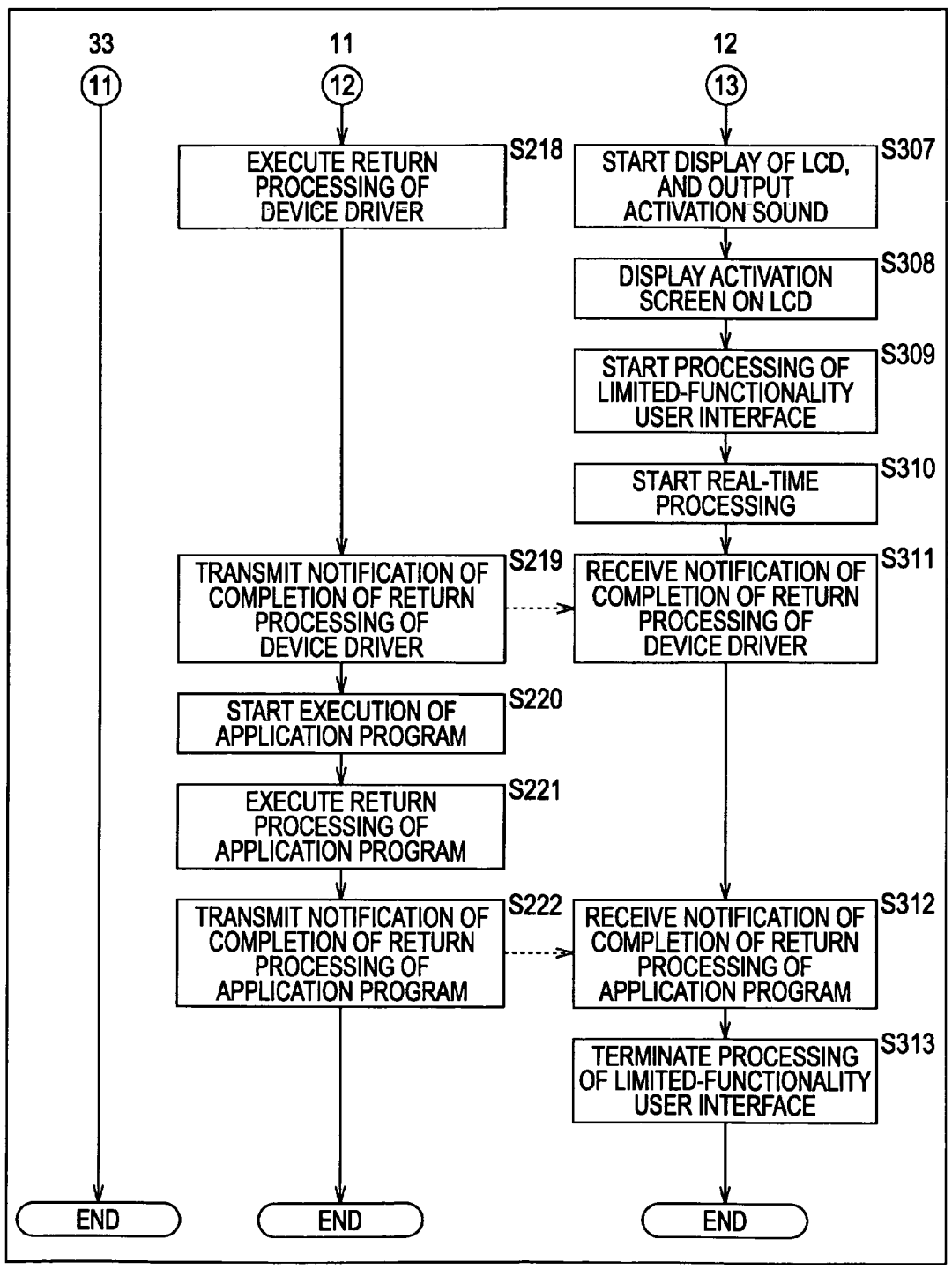
FIG. 16 is a flowchart illustrating the details of activation processing by a warm boot.

FIGS. 14 through 16 show a flowchart illustrating the details of activation processing by a warm boot. In step S101, the embedded controller 33 executing the activation-mode-determining-information acquiring program 203 acquires a signal from the input unit 31 which serves as an activating factor. That is, the activation-mode-determining-information acquiring program 203 acquires a signal indicating the depression of the power button, the wireless LAN button, or the USB button, or the opening/closing of the lens cap, which is supplied from the input unit 31 and serves as an activating factor. In accordance with the acquired signal, the embedded controller 33 executing the activation-mode-determining-information acquiring program 203 generates activating-factor information indicating an activation trigger such as the depression of the power button, the wireless LAN button, or the USB button, or the opening of the lens cap.

In step S102, the embedded controller 33 executing the activation-mode-determining-information storage processing program 204 stores into its internal memory the activating-factor information generated in accordance with the signal acquired in step S101. That is, when a signal indicating the depression of the power button, the wireless LAN button, or the USB button, or the opening/closing of the lens cap, which serves as an activating factor, is acquired from the input unit 31 by the activation-mode-determining-information acquiring program 203, activating-factor information indicating an activation factor such as the depression of the power button, the wireless LAN button, or the USB button, or the opening of the lens cap is generated, so the activation-mode-determining-information storage processing program 204 stores the generated activating-factor information into the internal memory of the embedded controller 33.

In step S103, the embedded controller 33 executing the power control program 201 causes the DC-DC converter 34 to start the supply of electric power to individual units of the digital still camera. Thus, the supply of power to the host CPU 11 through the general-purpose input/output unit 32 is started.

In step S104, the embedded controller 33 waits for a predetermined period of time until the supplied power and the operations of the individual units for which power supply has been started stabilize.

In step S105, the embedded controller 33 executing the other-CPU-reset control program 202 cancels the reset of the host CPU 11. For example, the embedded controller 33 cancels the reset of the host CPU 11 by changing the level of a reset signal on a signal line for supplying the reset signal which connects between the embedded controller 33 and the host CPU 11.

When the reset is cancelled, in step S201, the host CPU 11 activates a boot loader in the mask ROM 13 to start execution of the boot loader. That is, by means of a hardware interrupt for reset cancellation, the host CPU 11 executes an instruction stored at a predetermined address in the mask ROM 13, thereby activating the boot loader. In step S202, the host CPU 11 initializes the boot loader.

In step S203, the host CPU 11 executing the boot loader loads the secondary boot loader 101 stored in the NAND-type flash memory 17 to the SDRAM 29. In step S204, the host CPU 11 executes an instruction for a jump to the secondary boot loader 101, which is an instruction included in the boot loader, so the procedure jumps to the secondary boot loader 101. As a result, the host CPU 11 starts execution of the secondary boot loader 101.

Incidentally, the secondary boot loader 101 may be stored in the mask ROM 13 so that a jump is made to the secondary boot loader 101 stored in the mask ROM 13.

In step S205, the host CPU 11 initializes the secondary boot loader 101. Since the driver of the serial interface 19 is included in the secondary boot loader 101, communication can be performed between the host CPU 11 and the embedded controller 33 via the serial interface 19.

In step S206, the host CPU 11 executing the activation-mode-determining-information program 121 of the secondary boot loader 101 transmits a request for activation mode determining information to the embedded controller 33 via the serial interface 19.

In step S106, the embedded controller 33 executing the activation-mode-determining-information providing program 205 receives the request for activation mode determining information transmitted from the host CPU 11, via the serial interface 19. In step S107, the embedded controller 33 executing the activation-mode-determining-information providing program 205 transmits the activation mode determining information stored in the internal memory of the embedded controller 33, to the host CPU 11 via the serial interface 19.

In step S207, the host CPU 11 executing the activation-mode-determining-information acquiring program 121 of the secondary boot loader 101 receives the activation mode determining information transmitted from the embedded controller 33, via the serial interface 19.

In step S208, the host CPU 11 executing the activation-mode-determining-information acquiring program 121 of the secondary boot loader 101 stores the received activation mode determining information into the SDRAM 29. In this case, the host CPU 11 stores the activation mode determining information into a predetermined area of the storage area of the SDRAM 29.

In step S209, the host CPU 11 executing the activation mode determining program 122 of the secondary boot loader 101 determines the mode of activation on the basis of the activation mode determining information acquired by the reception in step S207. In this case, the mode of activation is determined to be the mode of activation by a warm boot. Incidentally, if the sleep state information indicates the suspend state S3 and also the battery attachment/detachment information indicates that the battery has been detached, or if the sleep state information indicates the hibernation S4, the activation mode determining program 122 determines the mode of activation to be the mode of activation by a warm boot.

In step S210, the host CPU 11 executing the secondary boot loader 101 initializes the general-purpose input/output unit 32.

In step S211, the host CPU 11 executing the set value reading program 123 of the secondary boot loader 101 loads set values for the shutter speed and exposure, zoom, or the size of an image to be shot and the compression ratio used for encoding, which are required for performing a return at the time of activation, from the NAND-type flash memory 17 to the SDRAM 29.

In step S212, the host CPU 11 executing the other-CPU-program reading program 124 of the secondary boot loader 101 loads the operating system 141 and application program 142 of the real-time processing CPU 12 from the NAND-type flash memory 17 to the SDRAM 29.

In step S213, the host CPU 11 executing the secondary boot loader 101 cancels the reset of the real-time processing CPU 12.

When the reset is cancelled, in step S301, the real-time processing CPU 12 starts execution of the operating system 141 loaded to the SDRAM 29. That is, for example, the real-time processing CPU 12 starts execution of the operating system 141 by executing an instruction stored at a predetermined address in the SDRAM 29, by means of a hardware interrupt or software interrupt for reset cancellation. In step S302, the host CPU 11 initializes the operating system 141.

In step S303, the real-time processing CPU 12 executing the activation-mode-determining-information acquiring program 161 of the operating system 141 reads the activation mode determining information stored in step S208 from the SDRAM 29. In step S304, the real-time processing CPU 12 executing the activation mode determining program 162 of the operating system 141 determines the mode of activation through the same processing as in step S209, on the basis of the activation mode determining information read in step S303. In this case, the mode of activation is determined to be the mode of activation by a warm boot.

In step S305, the real-time processing CPU 12 executing the operating system 141 activates the application program 142. In step S306, the real-time processing CPU 12 initializes the application program 142.

In step S307, the real-time processing CPU 12 executing the application program 142 controls the graphic controller 21 to start display of the LCD 20, and causes an unillustrated speaker or buzzer to output activation sound.

In step S308, the real-time processing CPU 12 executing the activation screen display program 173 of the application program 142 controls the graphic controller 21 to display an activation screen indicating activation on the LCD 20.

In step S309, the real-time processing CPU 12 executing the GUI processing program 172 of the application program 142 starts user interface processing through which a user instruction is acquired from the input unit 31 shared by the real-time processing CPU 12 with the host CPU 11 and which provides less functionality in comparison to the functionality of the application program 62, that is, limited-functionality user interface processing.

In step S310, the real-time processing CPU 12 executing the real-time processing program 171 of the application program 142 starts real-time control processing with respect to the unillustrated optical system, the CCD 14, the analog front end 15, and the signal processing unit 16.

Incidentally, upon making reference to the activating-factor information of the activation mode determining information, if activation has been done due to the opening of the lens cap, initialization processing of the unillustrated optical system, the CCD 14, the analog front end 15, and the signal processing unit 16 may be performed as the real-time control processing.

In parallel with steps S301 through S310 executed by the real-time processing CPU 12, steps S214 through S218 are executed by the host CPU 11. That is, in step S214, the host CPU 11 executing the warm-boot-image reading program 125 of the secondary boot loader 101 loads the warm-boot image from the NAND-type flash memory 17 to the SDRAM 29.

In step S215, the host CPU 11 executes an instruction for a jump to the kernel 71, which is an instruction included in the secondary boot loader 101, and the procedure jumps to the kernel 71. As a result, the host CPU 11 starts execution of the operating system 61.

In step S216, the host CPU 11 executing the operating system 61 detects the state of the power source including the DC-DC converter 34 and the battery 35, and executes return processing of the power management mechanism 73 such as correcting internal parameters in accordance with the detected state of the power source.

In step S217, the host CPU 11 executing the operating system 61 detects the occupancy state of the storage space in the SDRAM 29 or the like, and executes return processing of the kernel 71 such as correcting parameters for the management process of resources such as the SDRAM 29.

In step S218, the host CPU 11 executing the operating system 61 detects the state of each of devices such as the signal processing unit 16, the serial interface 19, the graphic controller 21, the memory card interface 23, the controller 25, the IDE interface 28, and the general-purpose input/output unit 32, and executes return processing of the device driver 72 such as correcting the parameters of the device driver 72 in accordance with the detected device state.

In step S219, the host CPU 11 executing the operating system 61 transmits a notification of the completion of return processing of the device driver 72 to the real-time processing CPU 12 via the bus.

In step S311, the real-time processing CPU 12 executing the operating system 141 receives the notification of the completion of return processing of the device driver 72, which is transmitted from the host CPU 11, via the bus.

Also, in step S220, the host CPU 11 executing the operating system 61 starts execution of the application program 62. In step S221, the host CPU 11 executes return processing of the application program 62 such as setting a set value for the shutter speed, exposure, zoom, or the like.

Incidentally, after step S221, the state of the digital still camera enters the initial state SON.

In step S222, the host CPU 11 transmits a notification of the completion of return processing of the application program 62 to the real-time processing CPU 12 via the bus.

In step S312, the real-time processing CPU 12 receives the notification of the completion of return processing of the application program 62, which is transmitted from the host CPU 11, via the bus.

In step S313, the real-time processing CPU 12 executing the application activation/termination control program 163 of the operating system 141 terminates the limited-functionality user interface processing by terminating the GUI processing program 172 of the application program 142, and the activation processing by a warm boot ends.

In this way, the activation processing by a warm boot enables a quick transition from a sleep state to the initial state SON.

Figure 17:
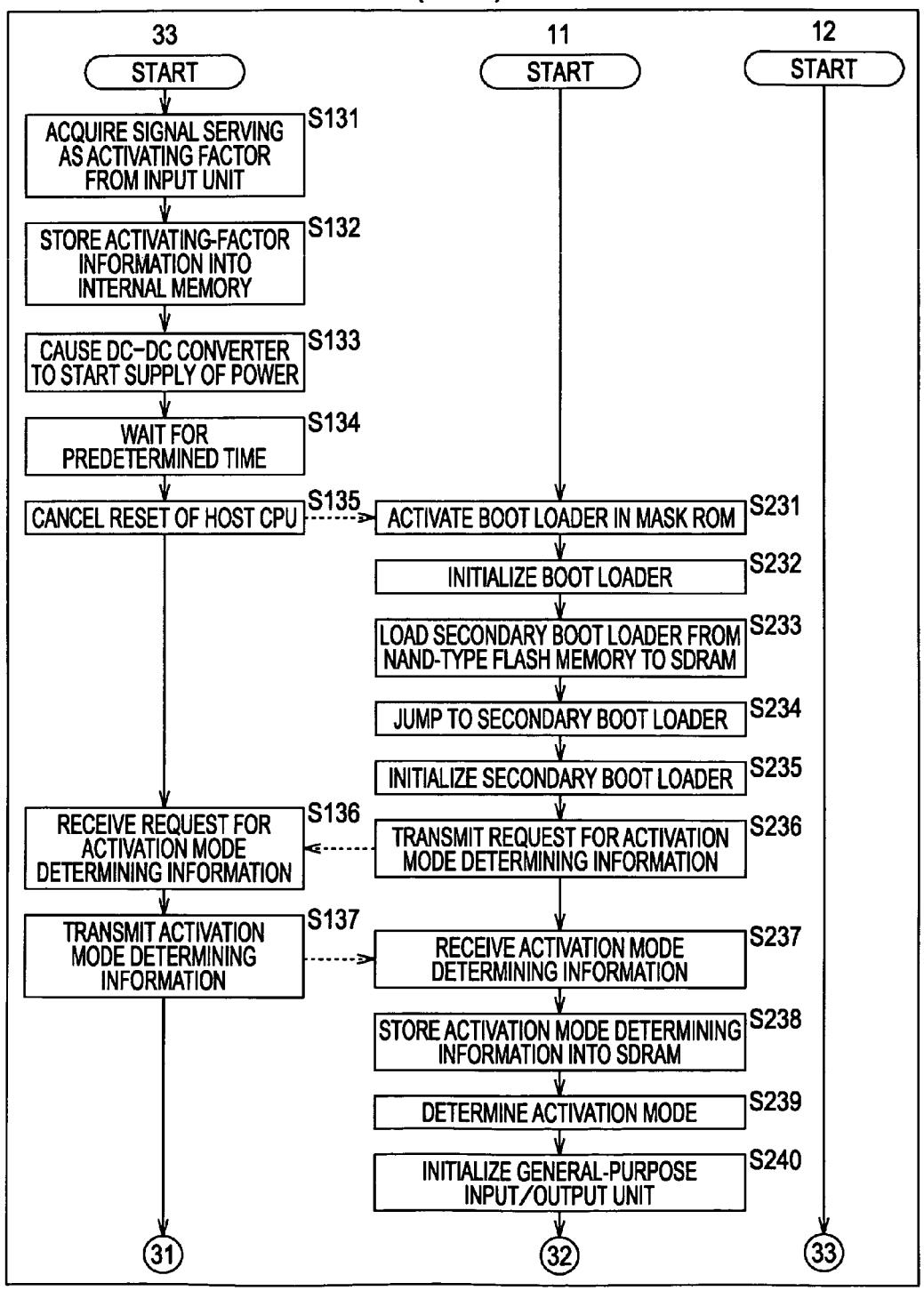
FIG. 17 is a flowchart illustrating the details of activation processing by a hot boot.
Figure 18:
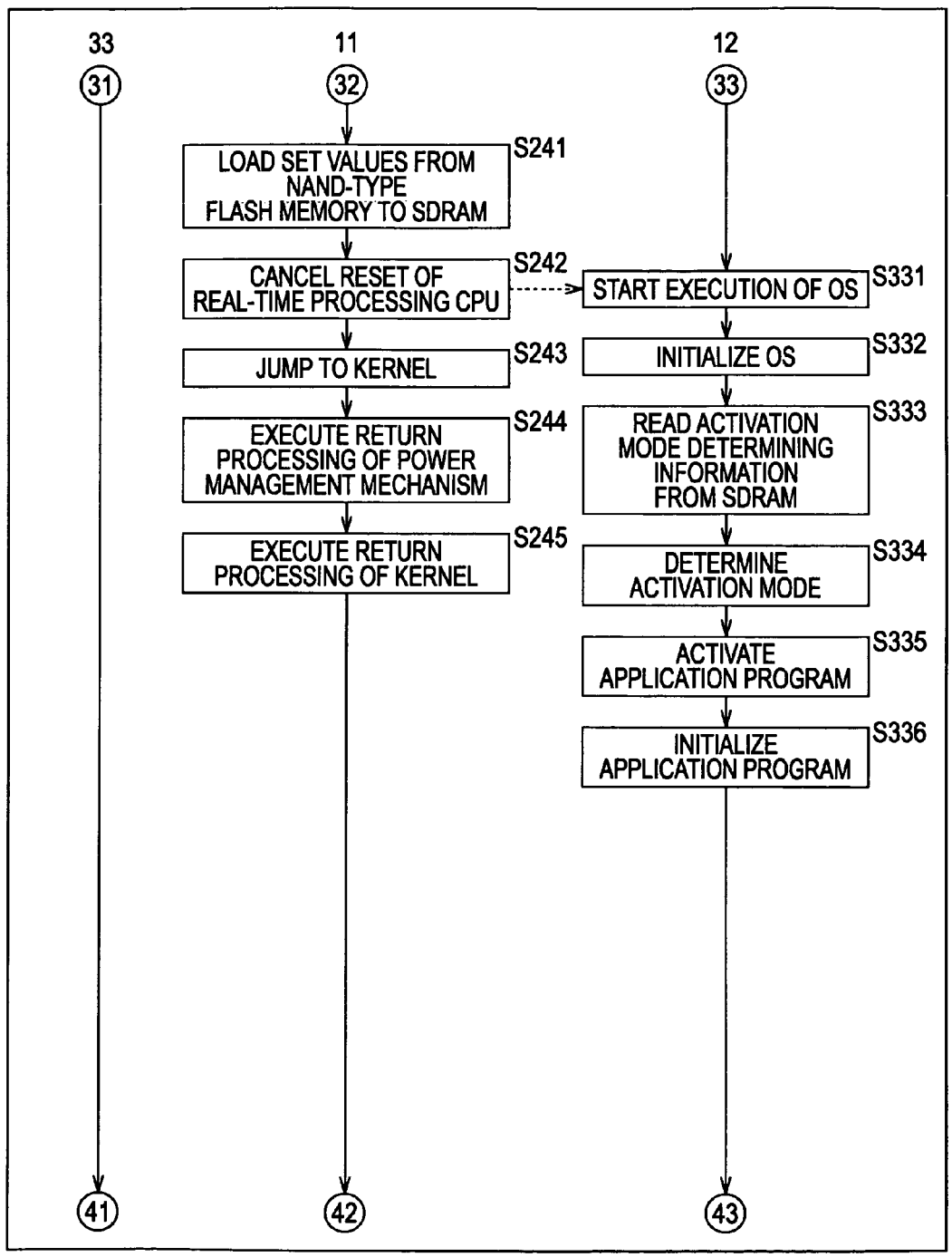
FIG. 18 is a flowchart illustrating the details of activation processing by a hot boot.
Figure 19:
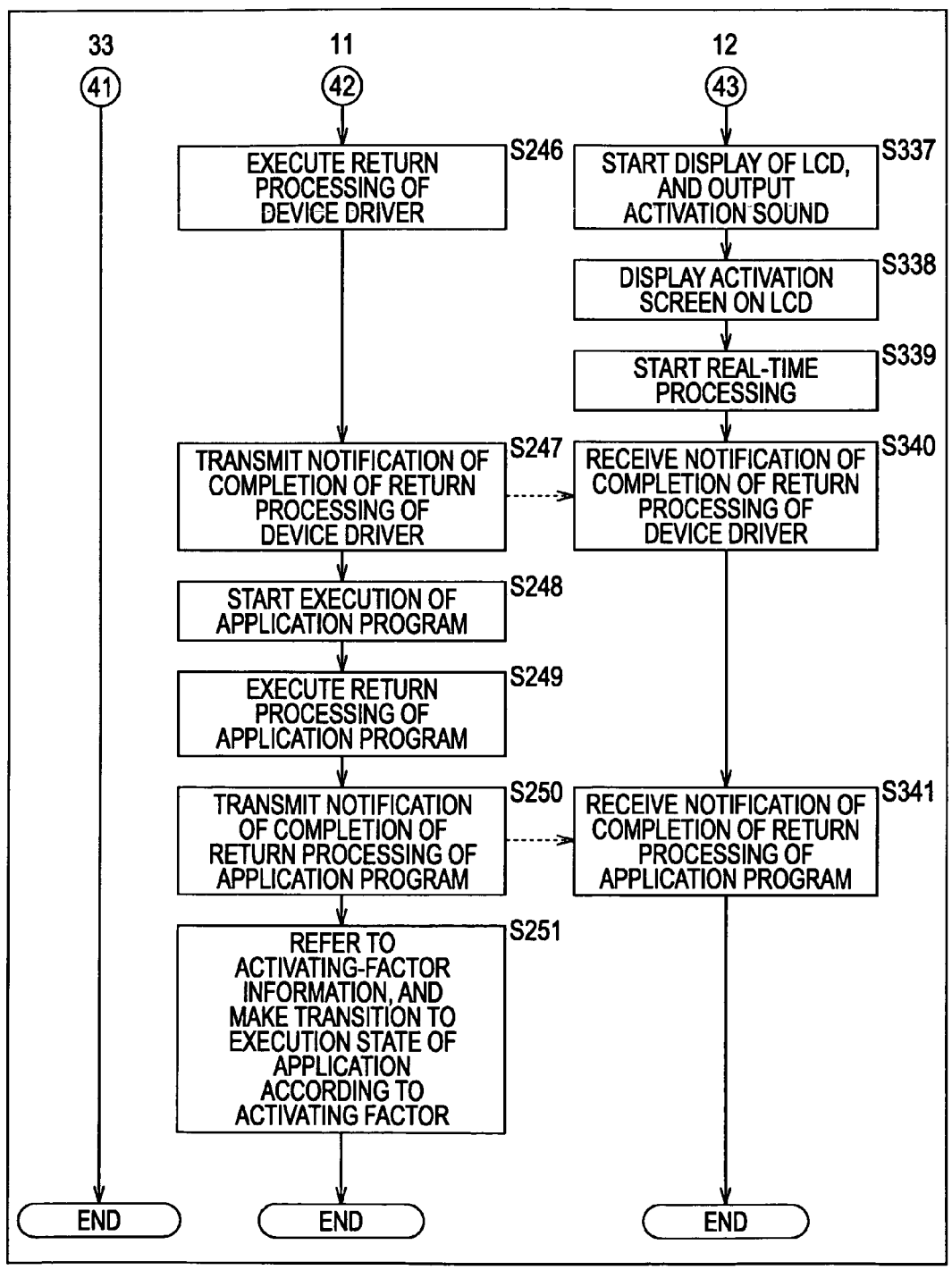
FIG. 19 is a flowchart illustrating the details of activation processing by a hot boot.

Next, referring to a flowchart of FIGS. 17 through 19, activation processing by a hot boot will be described in detail.

Since steps S131 through S137 executed by the embedded controller 33 are respectively the same as steps S101 through S107 in FIG. 14, description thereof is omitted.

Since steps S231 through S238 executed by the host CPU 11 are respectively the same as steps S201 through S208 in FIG. 14, description thereof is omitted.

In step S239, the host CPU 11 executing the activation mode determining program 122 of the secondary boot loader 101 determines the mode of activation on the basis of the activation mode determining information acquired by the reception in step S237. In this case, the mode of activation is determined to be the mode of activation by a hot boot. Incidentally, if the sleep state information indicates the suspend state S3 and the battery attachment/detachment information indicates that the battery has not been detached, the activation mode determining program 122 determines the mode of activation to be the mode of activation by a hot boot.

Since steps S240 and S241 executed by the host CPU 11 are respectively the same as steps S210 and S211 in FIG. 14 or 15, description thereof is omitted.

In step S242, the host CPU 11 executing the secondary boot loader 101 cancels the reset of the real-time processing CPU 12.

Since steps S331 through S333 executed by the real-time processing CPU 12 are respectively the same as steps S301 through S303 in FIG. 15, description thereof is omitted.

In step S334, the real-time processing CPU 12 executing the activation mode determining program 162 of the operating system 141 determines the mode of activation through the same processing as in step S239, on the basis of the activation mode determining information read in step S333. In this case, the mode of activation is determined to be the mode of activation by a hot boot.

Since steps S335 through S338 executed by the real-time processing CPU 12 are respectively the same as steps S305 through S308 in FIG. 15 or 16, description thereof is omitted.

In step S339, the real-time processing CPU 12 executing the real-time processing program 171 of the application program 142 starts real-time control processing with respect to the unillustrated optical system, the CCD 14, the analog front end 15, and the signal processing unit 16.

That is, in this case, the execution of the GUI processing program 172 by the real-time processing CPU 12 is inhibited. Accordingly, the execution of user interface processing through which a user instruction is acquired from the input unit 31 shared by the real-time processing CPU 12 with the host CPU 11 and which provides less functionality in comparison to the functionality of the application program 62, that is, limited-functionality user interface processing, is inhibited.

In the case of activation by a hot boot, since the host CPU 11 activates extremely quickly, configuring the real-time processing CPU 12 not to execute the GUI processing program 172 leads to quicker activation.

In parallel with steps S331 through S339 executed by the real-time processing CPU 12, steps S243 through S246 are executed by the host CPU 11. That is, in step S243, the host CPU 11 executes an instruction for a jump to the kernel 71, which is an instruction included in the secondary boot loader 101, and the procedure jumps to the kernel 71. As a result, the host CPU 11 starts execution of the operating system 61.

Since steps S244 through S246 executed by the host CPU 11 are respectively the same as steps S216 through S218 in FIG. 15 or 16, description thereof is omitted.

Further, since steps S247 through S250 executed by the host CPU 11 are respectively the same as steps S219 through S222 in FIG. 16, description thereof is omitted. Further, since steps S340 through S341 executed by the real-time processing CPU 12 are respectively the same as steps S311 through S341 in FIG. 16, description thereof is omitted.

In step S251 after step S250, the host CPU 11 executing the state transition processing program 85 of the application program 62 refers to the activating-factor information of the activation mode determining information stored in the SDRAM 29, and causes the state of the digital still camera to transition to an application execution state according to an activating factor, and the activation processing by a hot boot ends. For example, if, in step S251, the activating factor is the depression of the power button of the input unit 31, the state transition processing program 85 activates the browse processing program 82, and causes the state of the digital still camera to transition to the browse processing execution state. Also, for example, if, in step S251, the activating factor is the opening of the lens cap, the state transition processing program 85 activates the shooting processing program 81, and causes the state of the digital still camera to transition to the shooting processing execution state.

In this way, the activation processing by a hot boot allows extremely quick activation, and also a transition to, of the working state S0, a state of executing processing according to an activating factor.

Figure 20:
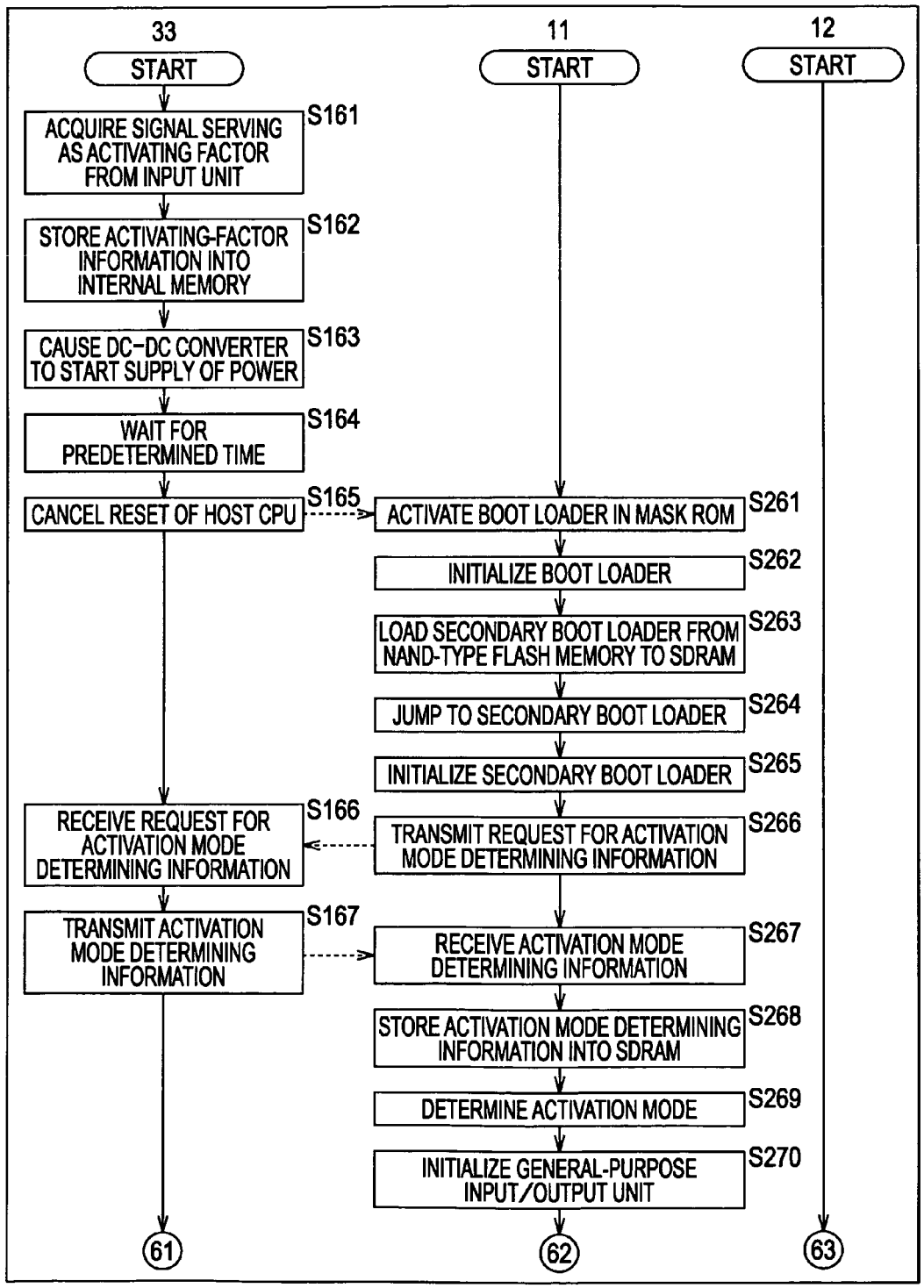
FIG. 20 is a flowchart illustrating the details of activation processing by a cold boot.
Figure 21:
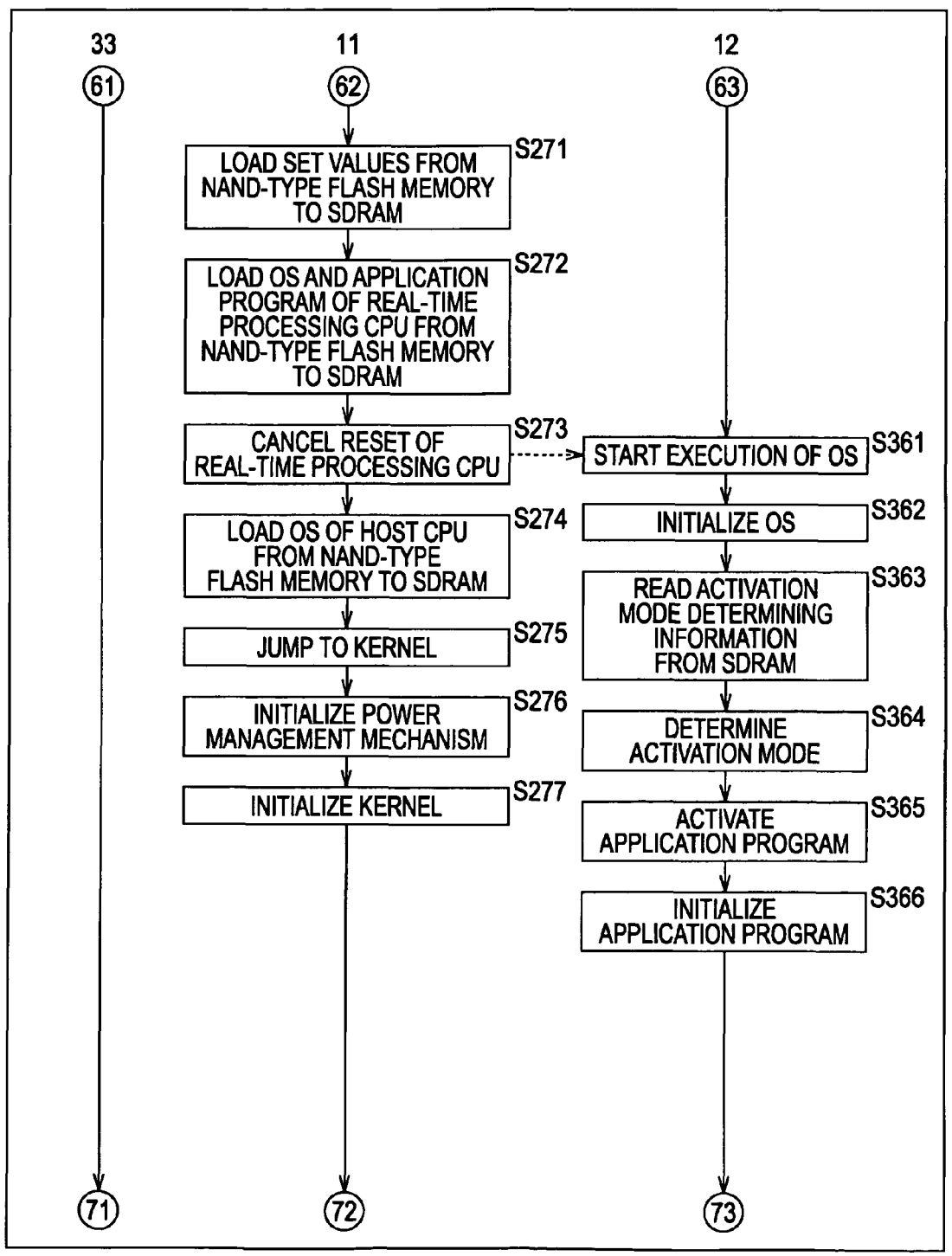
FIG. 21 is a flowchart illustrating the details of activation processing by a cold boot.
Figure 22:
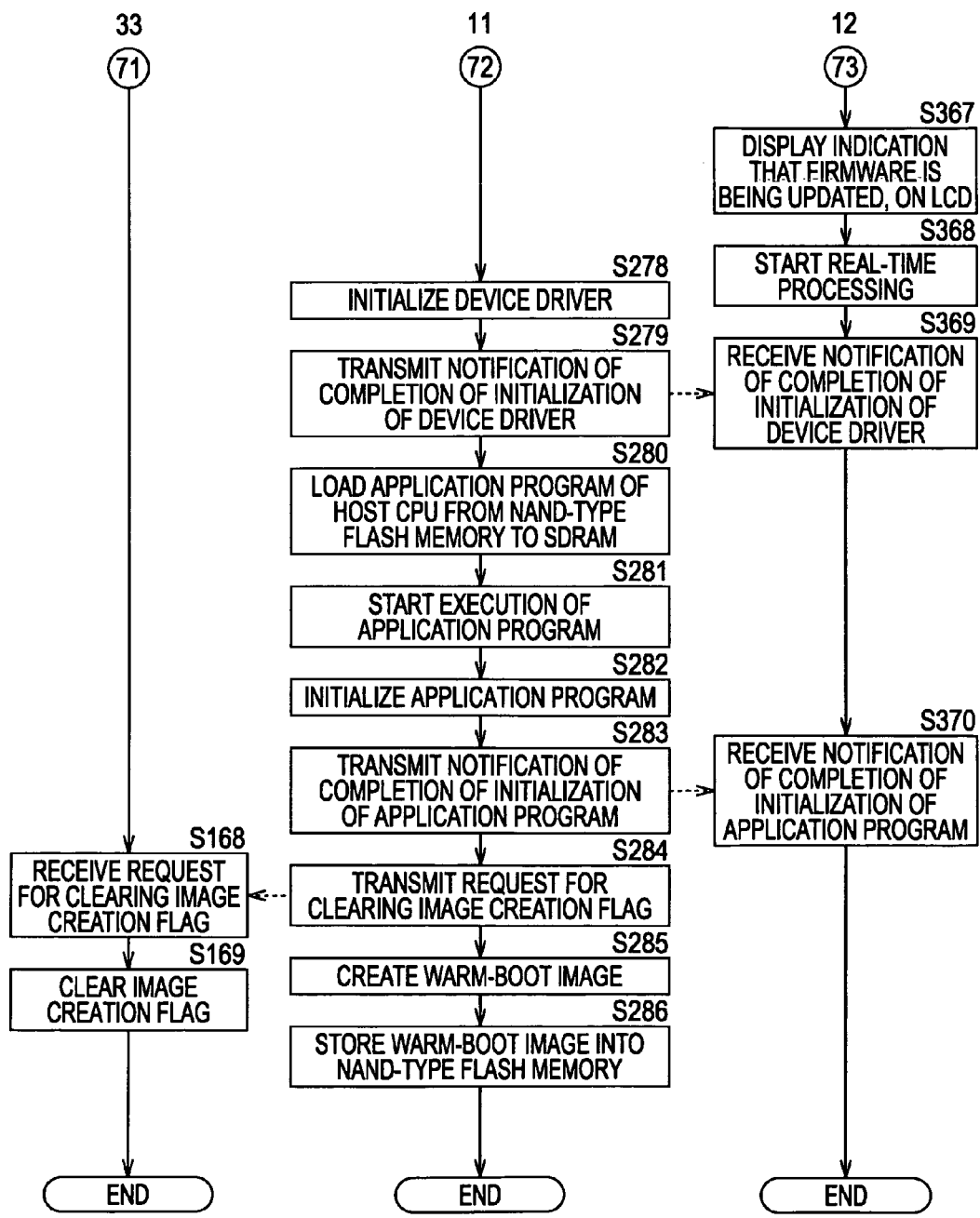
FIG. 22 is a flowchart illustrating the details of activation processing by a cold boot.

Next, referring to a flowchart shown in FIGS. 20 through 22, description will be given of the details of activation processing by a cold boot, which is executed in a factory prior to shipping a digital still camera, or executed when updating so-called firmware.

Since steps S161 through S167 executed by the embedded controller 33 are respectively the same as steps S101 through S107 in FIG. 14, description thereof is omitted.

Since steps S261 through S268 executed by the host CPU 11 are respectively the same as steps S201 through S208 in FIG. 14, description thereof is omitted.

In step S269, the host CPU 11 executing the activation mode determining program 122 of the secondary boot loader 101 determines the mode of activation on the basis of the activation mode determining information acquired by the reception in step S267. In this case, the mode of activation is determined to be the mode of activation by a cold boot.

For example, in step S269, the host CPU 11 executing the activation mode determining program 122 refers to an image creation flag included in the sleep state information, and if the image creation flag is set, that is, if the image creation flag is standing up, it is necessary to create a warm-boot image, so the mode of activation is determined to be the mode of activation by a cold boot.

Incidentally, the image creation flag is set in sleep processing described later when, for example, updated firmware is acquired, and updating of firmware is instructed by the user.

Since steps S270 through S273 executed by the host CPU 11 are respectively the same as steps S210 to 213 in FIG. 14 or 15, description thereof is omitted.

Since steps S361 through S363 executed by the real-time processing CPU 12 are respectively the same as steps S301 through S303 in FIG. 15, description thereof is omitted.

In step S364, the real-time processing CPU 12 executing the activation mode determining program 162 of the operating system 141 determines the mode of activation through the same processing as in step S269, on the basis of the activation mode determining information read in step S363. In this case, the mode of activation is determined to be the mode of activation by a cold boot.

Since steps S365 and S366 executed by the real-time processing CPU 12 are respectively the same as steps S305 and S306 in FIG. 15, description thereof is omitted.

In step S367, the real-time processing CPU 12 executing the application program 142 controls the graphic controller 21 to display on the LCD 20 an indication that firmware is being updated.

Thus, the user can thus learn that updating of firmware is being performed.

Assuming that the control of a display indicating that firmware is being updated is performed by the host CPU 11, a warm-boot image for displaying an indication that firmware is being updated is generated. However, since the control of a display indicating that firmware is being updated is performed by the real-time processing CPU 12, even when activation processing by a warm boot is executed by using the generated warm-boot image, an indication that firmware is being updated is not displayed.

In step S368, the real-time processing CPU 12 executing the real-time processing program 171 of the application program 142 starts real-time control processing with respect to the unillustrated optical system, the CCD 14, the analog front end 15, and the signal processing unit 16.

That is, in this case, the execution of the GUI processing program 172 by the real-time processing CPU 12 is inhibited. Thus, the execution of user interface processing through which a user instruction is acquired from the input unit 31 shared by the real-time processing CPU 12 with the host CPU 11 and which provides less functionality in comparison to the functionality of the application program 62, that is, limited-functionality user interface processing, is inhibited. Also, in this case, execution of the activation screen display program 173 by the real-time processing CPU 12 is inhibited. Thus, display of the activation screen indicating activation on the LCD 20 is inhibited.

In parallel with steps S361 through S368 executed by the real-time processing CPU 12, steps S274 through S278 are executed by the host CPU 11. That is, in step S274, the host CPU 11 executing the secondary boot loader 101 loads the operating system 61 from the NAND-type flash memory 17 to the SDRAM 29.

In step S275, the host CPU 11 executes an instruction for a jump to the kernel 71, which is an instruction included in the secondary boot loader 101, and the procedure jumps to the kernel 71. As a result, the host CPU 11 starts execution of the operating system 61.

In step S276, the host CPU 11 executing the power management mechanism 73 of the operating system 61 detects the state of the power source such as the DC-DC converter 34 and the battery 35, and initializes the power management mechanism 73 by, for example, initializing internal parameters in accordance with the detected state of the power source.

In step S277, the host CPU 11 executing the kernel 71 of the operating system 61 detects the occupancy state of the storage space in the SDRAM 29 or the like, and initializes the kernel 71 by, for example, initializing parameters for the management process of resources such as the SDRAM 29.

In step S278, the host CPU 11 executing the operating system 61 detects each of devices such as the signal processing unit 16, the serial interface 19, the graphic controller 21, the memory card interface 23, the controller 25, the IDE interface 28, and the general-purpose input/output unit 32 and also detects the state of the device, and initializes the device driver 72 by, for example, initializing the parameters of the device driver 72 in accordance with the result.

In step S279, the host CPU 11 executing the operating system 61 transmits a notification of the completion of initialization of the device driver 72 to the real-time processing CPU 12 via the bus.

In step S369, the real-time processing CPU 12 executing the operating system 141 receives the notification of the completion of initialization of the device driver 72, which is transmitted from the host CPU 11, via the bus.

Also, in step S280, the host CPU 11 executing the operating system 61 loads the application program 62 from the NAND-type flash memory 17 to the SDRAM 29. In step S281, the host CPU 11 executing the operating system 61 starts execution of the application program 62.

In step S282, the host CPU 11 initializes the application program 62. Incidentally, after step S282, the state enters the initial state SON.

In step S283, the host CPU 11 transmits a notification of the completion of initialization of the application program 62 to the real-time processing CPU 12 via the bus.

In step S370, the real-time processing CPU 12 receives the notification of the completion of initialization of the application program 62, which is transmitted from the host CPU 11, via the bus.

In step S284, the host CPU 11 executing the sleep state information providing program 75 transmits a request for clearing an image creation flag to the embedded controller 33, via the serial interface 19.

In step S168, the embedded controller 33 executing the activation-mode-determining-information acquiring program 203 receives the request for clearing an image creation flag, which is transmitted from the host CPU 11, via the serial interface 19.

In step S169, the embedded controller 33 executing the activation-mode-determining-information storage processing program 204 clears the image creation flag included in the sleep state information.

In step S285, the host CPU 11 executing the warm-boot-image generating program 78 of the operating system 61 reads the program and data stored in the SDRAM 29 to generate a warm-boot image. That is, the warm-boot-image generating program 78 generates a warm-boot image by using, as its data, the program and data loaded in the SDRAM 29 in the initial state SON of the working state S0 as they are.

In step S286, the host CPU 11 executing the warm-boot-image generating program 78 of the operating system 61 stores the warm-boot image generated in step S285 into the NAND-type flash memory 17, and the activation processing by a cold boot ends. For example, in step S268, the warm-boot-image generating program 78 stores the generated warm-boot image to the NAND-type flash memory 17 in such a way that the generated warm-boot image is written over the warm-boot image previously stored in the NAND-type flash memory 17.

In this way, through the activation processing by a cold boot, a warm-boot image including updated firmware is generated and stored into the NAND-type flash memory 17.

Incidentally, the termination processing described below may be executed immediately after step S286.

Also, after verifying that a warm-boot image has been generated properly, the host CPU 11 may transmit a request for clearing an image creation flag to the embedded controller 33 via the serial interface 19, so that the embedded controller 33 receives the request for clearing the image creation flag and clears the image creation flag included in the sleep state information. This means that the image creation flag is cleared only when a warm-boot image has been generated properly. That is, a warm-boot image can be generated more reliably.

Likewise, it is a matter of course that the image creation flag may be cleared only after a warm-boot image has been properly stored into the NAND-type flash memory 17.

Furthermore, a configuration may be employed in which, after activation processing by a cold boot is completed, sleep is entered, and activation is done by a warm boot by using the warm-boot image generated in step S285, and if this activation has been performed properly, the image creation flag is cleared. In this way, the image creation flag is cleared only when activation has been performed properly by using a warm-boot image.

For example, a configuration may be employed in which, when a warm-boot image is generated, an image-generation completion flag, which is included in the sleep state information together with the image creation flag and indicates whether or not a warm-boot image has been generated, is set so as to indicate that a warm-boot image has been generated, and then, next, when activating, reference is made to the image-generation completion flag that is being set and the set image creation flag that is being set, the mode of activation is determined to be the mode of activation by a warm boot, and after return processing of the operating system 61 is completed, and return processing of the application program 62 is completed, the image-generation completion flag and the image creation flag are cleared.

Incidentally, in a case where the image creation flag and the image-generation completion flag are used, when the image-generation completion flag is reset, and the image creation flag is set, the mode of activation is determined to be the mode of activation by a cold boot, and when the image-generation completion flag is set, and the image creation flag is reset, the mode of activation is determined on the basis of the sleep state determined when entering sleep, and the history of attachment/detaching of the battery 35 in the sleep state.

Next, referring to a flowchart of FIG. 23, an example of sleep processing will be described.

In step S501, the host CPU 11 executing the state transition processing program 85 of the application program 62 terminates the execution of the shooting processing program 81, the browse processing program 82, the setting processing program 83, or the USB mass-storage processing program 84, thereby causing the state of the digital still camera to transition to the initial state SON of the working state S0.

In step S502, the host CPU 11 executing the sleep state determining program 74 of the operating system 61 determines the sleep state to which a transition is to be made. That is, the sleep state determining program 74 determines the sleep state to which a transition is to be made to be one of the suspend state S3 and hibernation S4.

For example, in step S502, if the output voltage of the battery 35 is equal to or higher than a predetermined threshold, and the power button of the input unit 31 has been depressed, or if the output voltage of the battery 35 is equal to or higher than a predetermined threshold, and the lens cap has been closed, the sleep state determining program 74 determines the sleep state to which a transition is to be made to be the suspend state S3.

For example, in step S502, if the output voltage of the battery 35 is less than a predetermined threshold, or if the power button has been depressed for a time longer than a predetermined time, the sleep state determining program 74 determines the sleep state to which a transition is to be made to be the hibernation 54.

In step S503, the host CPU 11 executing the sleep state information providing program 75 of the operating system 61 transmits the sleep state to which a transition is to be made to the embedded controller 33, via the serial interface 19.

In step S601, the embedded controller 33 executing the activation-mode-determining-information acquiring program 203 receives the sleep state information transmitted from the host CPU 11, via the serial interface 19. In step S602, the embedded controller 33 executing the activation-mode-determining-information storage processing program 204 stores the sleep state information received in step S601 into the internal memory of the embedded controller 33.

Incidentally, if updated firmware, that is, the operating system 61 or the application program 62 is acquired, and updating of firmware is instructed by the user, in step S503, sleep state information including an image creation flag that is being set is transmitted. In step S601, the sleep state information including the set image creation flag is received, and in step S602, the sleep state information including the set image creation flag is stored into the internal memory of the embedded controller 33.

On the other hand, if updated firmware is not acquired, or if updating of firmware is not instructed by the user even through updated firmware has been acquired, in step S503, sleep state information including a cleared image creation flag is transmitted. In step S601, the sleep state information including the cleared image creation flag is received, and in step S602, the sleep state information including the cleared image creation flag is stored into the internal memory of the embedded controller 33.

In step S603, the embedded controller 33 executing the battery attachment/detachment detecting program 206 detects the attachment/detachment of the battery 35 by detecting the output voltage of the DC-DC converter 34. Then, the embedded controller 33 executing the activation-mode-determining-information acquiring program 203 generates battery attachment/detachment information according to the detection result of attachment/detachment of the battery 35.

In step S604, the embedded controller 33 executing the activation-mode-determining-information storage processing program 204 stores the battery attachment/detachment information corresponding to the detection result of attachment/detachment of the battery 35 into its internal memory. That is, in step S604, if the battery 35 is detached, the activation-mode-determining-information storage processing program 204 stores battery attachment/detachment information indicating that the battery 35 has been detached into its internal memory, and if the battery 35 is attached, the activation-mode-determining-information storage processing program 204 stores battery attachment/detachment information indicating that the battery 35 is not detached (has not been detached), into its internal memory.

On the other hand, in step S504, the host CPU 11 executing the application program 62 executes termination processing of the application program 62. For example, in step S504, the application program 62 executes such termination processing as closing the file that stores data of shot images.

In step S505, the host CPU 11 executing the application program 62 transmits a notification of termination to the real-time processing CPU 12 via the bus.

In step S701, the real-time processing CPU 12 executing the operating system 141 receives the notification of termination transmitted from the host CPU 11, via the bus.

In step S702, the real-time processing CPU 12 executing the operating system 141 and the application program 142 executes termination processing. In step S703, the real-time processing CPU 12 executing the operating system 141 transmits a notification of start of termination processing to the host CPU 11 via the bus.

For example, in step S702, the real-time processing program 171 of the application program 142 returns the lens constituting the unillustrated optical system to the end position.

In step S506, the host CPU 11 executing the application program 62 receives the notification of start of termination processing transmitted from the real-time processing CPU 12, via the bus.

Then, when the termination processing of the real-time processing CPU 12 is completed, in step S704, the real-time processing CPU 12 executing the operating system 141 transmits a notification of completion of termination processing to the host CPU 11 via the bus. Thus, in step S507, the host CPU 11 executing the operating system 61 receives the notification of completion of termination processing transmitted from the real-time processing CPU 12, via the bus.

Incidentally, after transmitting the notification of completion of termination processing to the host CPU 11, the real-time processing CPU 12 is reset by control from the host CPU 11 that has received the notification of completion of termination processing, and the reset state is maintained, or the real-time processing CPU 12 executes an infinite loop instruction.

In step S508, the host CPU 11 executing the set value storage processing program 77 of the operating system 61 stores set values required for performing a return at the time of activation, into the NAND-type flash memory 17. The set values to be stored into the NAND-type flash memory 17 are those indicating the shutter speed and exposure, zoom, and the size of an image to be shot and compression ratio used for encoding, or the values of internal registers of the host CPU 11. Also, the set values to be stored into the NAND-type flash memory 17 in step S508 include the values of internal registers of the real-time processing CPU 12 and the values of registers of the internal interface of the real-time processing CPU 12, which are stored and maintained in the SDRAM 29 as variables for the operating system 141 and the application program 142.

In step S509, the host CPU 11 executing the operating system 61 executes termination processing of the device driver 72. That is, the operating system 61 executes termination processing of the device driver 72, such as terminating the process for controlling devices such as the signal processing unit 16, the serial interface 19, the graphic controller 21, the memory card interface 23, the controller 25, the IDE interface 28, and the general-purpose input/output unit 32.

As a part of the termination processing of the device driver 72, in step S510, the host CPU 11 executing the other-CPU-program reading program 76 of the operating system 61 loads the operating system 141 and application program 142 of the real-time processing CPU 12, from the NAND-type flash memory 17 to the SDRAM 29.

Thus, when activation processing by a hot boot is executed next time, there is no need to load the operating system 141 and the application program 142 to the SDRAM 29 in the activation processing, thus allowing quicker activation.

While the real-time processing CPU 12 is executing the termination processing, the operating system 141 and the application program 142 are executed, and internal variables and the like of the operating system 141 and application program 142 are changed. Therefore, loading of the operating system 141 and application program 142 to the SDRAM 29 is performed after the termination processing of the real-time processing CPU 12 is completed.

Incidentally, in a case where, before loading the operating system 141 and application program 142 of the real-time processing CPU 12 from the NAND-type flash memory 17 to the SDRAM 29, the host CPU 11 resets the real-time processing CPU 12, and causes the reset state of the real-time processing CPU 12 to be maintained, as compared with a case where the real-time processing CPU 12 is caused to execute an infinite loop instruction, the operating system 141 and the application program 142 can be more safely loaded to the SDRAM 29 and executed at activation. That is, it is possible to reduce the possibility of the operating system 141 and the application program 142 loaded to the SDRAM 29 being changed by the real-time processing CPU 12 before the next activation.

In a case where the real-time processing CPU 12 is not put into a reset state, and the real-time processing CPU 12 is caused to execute an infinite loop instruction, the infinite loop instruction to be executed by the real-time processing CPU 12 is stored in a storage area other than the storage area into which the operating system 141 and the application program 142 are loaded. For example, the real-time processing CPU 12 executes an infinite loop instruction stored in a storage area of the SDRAM 29 other than the storage area into which the operating system 141 and the application program 142 are loaded, or an infinite loop instruction stored in the mask ROM 13.

In this way, when the real-time processing CPU 12 completes termination processing, the reset state of the real-time processing CPU 12 is maintained, or the real-time processing CPU 12 executes an infinite loop instruction. It is thus possible to prevent the operating system 141 and the application program 142 loaded to the SDRAM 29 from being changed before the next activation by a hot boot.

Incidentally, step S510 may be skipped if the sleep state is determined to be the hibernation S4 in step S502.

When the termination processing of the device driver 72 is completed, in step S511, the host CPU 11 executing the operating system 61 executes termination processing of the kernel 71. For example, in step S511, the operating system 61 completes a predetermined process, such as the monitoring of the application program 62 and devices, management of resources such as the SDRAM 29, or inter-process communication.

When the termination processing of the kernel 71 is completed, in step S512, the host CPU 11 executing the operating system 61 executes termination processing of the power management mechanism 73 such as setting parameters for a sleep state.

In step S513, the host CPU 11 executing the power management mechanism 73 of the operating system 61 transmits a request for stopping supply of power to the embedded controller 33 via the serial interface 19.

In step S605, the embedded controller 33 executing the power control program 201 receives the request for stopping supply of power transmitted from the host CPU 11, via the serial interface 19.

In step S606, the embedded controller 33 executing the power control program 201 causes the DC-DC converter 34 to stop supply of power, and the processing ends. For example, in step S606, the power control program 201 refers to the sleep state information stored in the internal memory of the embedded controller 33. In the case of a transition to the suspend state S3, the embedded controller 33 causes the DC-DC converter 34 to stop (shut off) the supply of power to the host CPU 11 and the real-time processing CPU 12 while keeping the supply of power to the SDRAM 29 as it is, and in the case of a transition to the hibernation S4, the embedded controller 33 causes the DC-DC converter 34 to stop (shut off) the supply of power to the SDRAM 29, the host CPU 11, and the real-time processing CPU 12.

In this way, after a sleep state is determined, and sleep state information indicating the determined sleep state is stored into the internal memory of the embedded controller 33, the state of the digital still camera is made to transition to the determined sleep state. Also, prior to a transition to the sleep state, set values required for performing a return at the time of activation are stored into the NAND-type flash memory 17.

Furthermore, prior to a transition to the suspend state S3, the operating system 141 and application program 142 of the real-time processing CPU 12 are loaded to the SDRAM 29.

Incidentally, in a case where the operating system 141 and application program 142 of the real-time processing CPU 12 are loaded to the SDRAM 29 prior to a transition to the suspend state S3, in step S332 described above, the real-time processing CPU 12 reads from the SDRAM 29 the values of internal registers of the real-time processing CPU 12 or the values of registers of the internal interface of the real-time processing CPU 12, which are included in the set values loaded to the SDRAM 29 in the processing of step S241 and are values as they were left before entering sleep, and sets the values respectively to the internal registers of the real-time processing CPU 12 or the registers of the internal interface of the real-time processing CPU 12.

In this way, the operating system 141 is executed substantially after correct values are set to the internal registers of the real-time processing CPU 12 and the registers of the internal interface of the real-time processing CPU 12. Thus, the operating system 141 and the application program 142 are executed properly with reliability, without the real-time processing CPU 12 going haywire, or without the operating system 141 and the application program 142 loaded to the SDRAM 29 being destructed before a transition to the suspend state S3.

Figure 24:
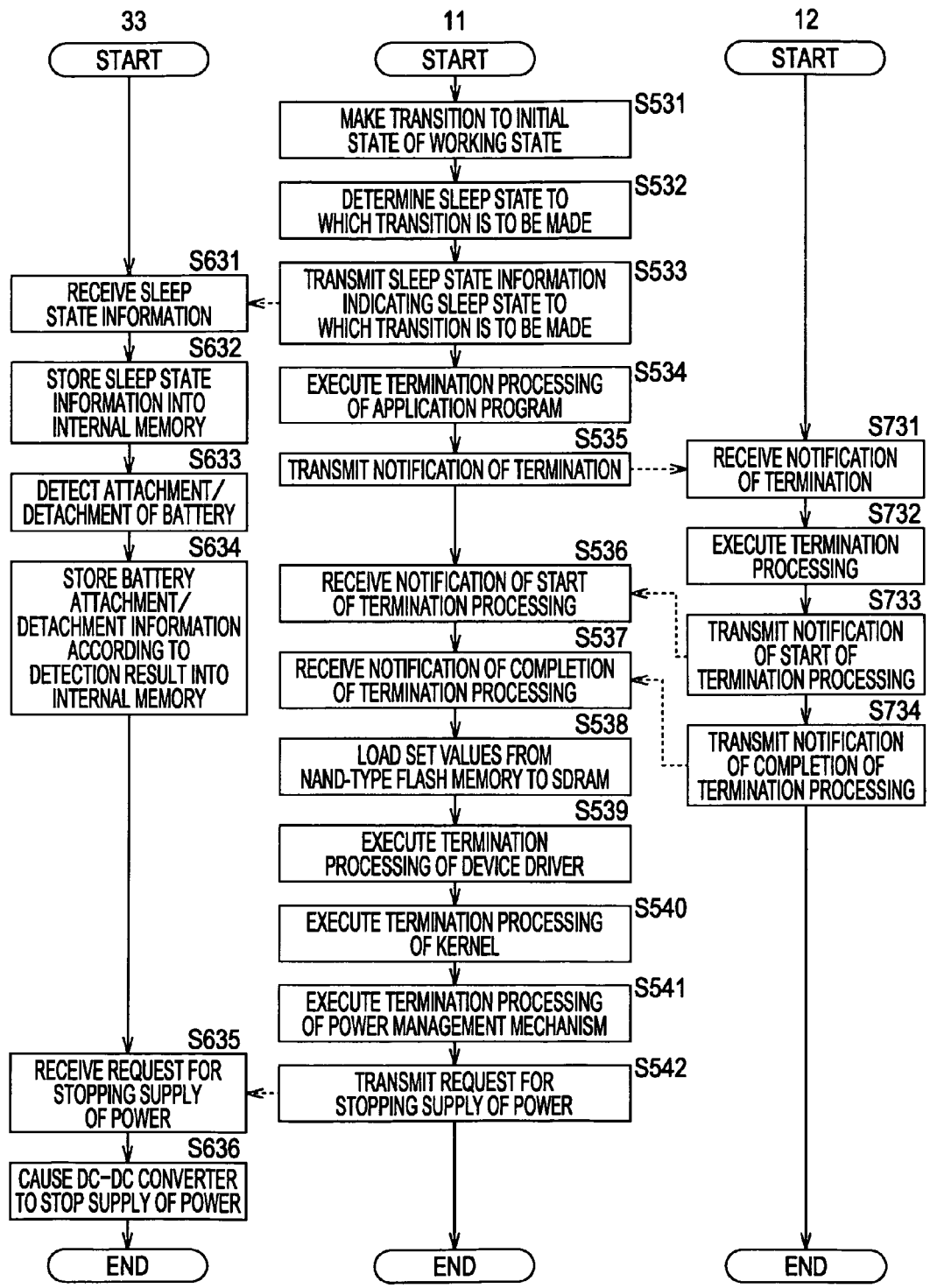
FIG. 24 is a flowchart illustrating another example of sleep processing.

FIG. 24 is a flowchart showing another example of sleep processing.

Figure 23:
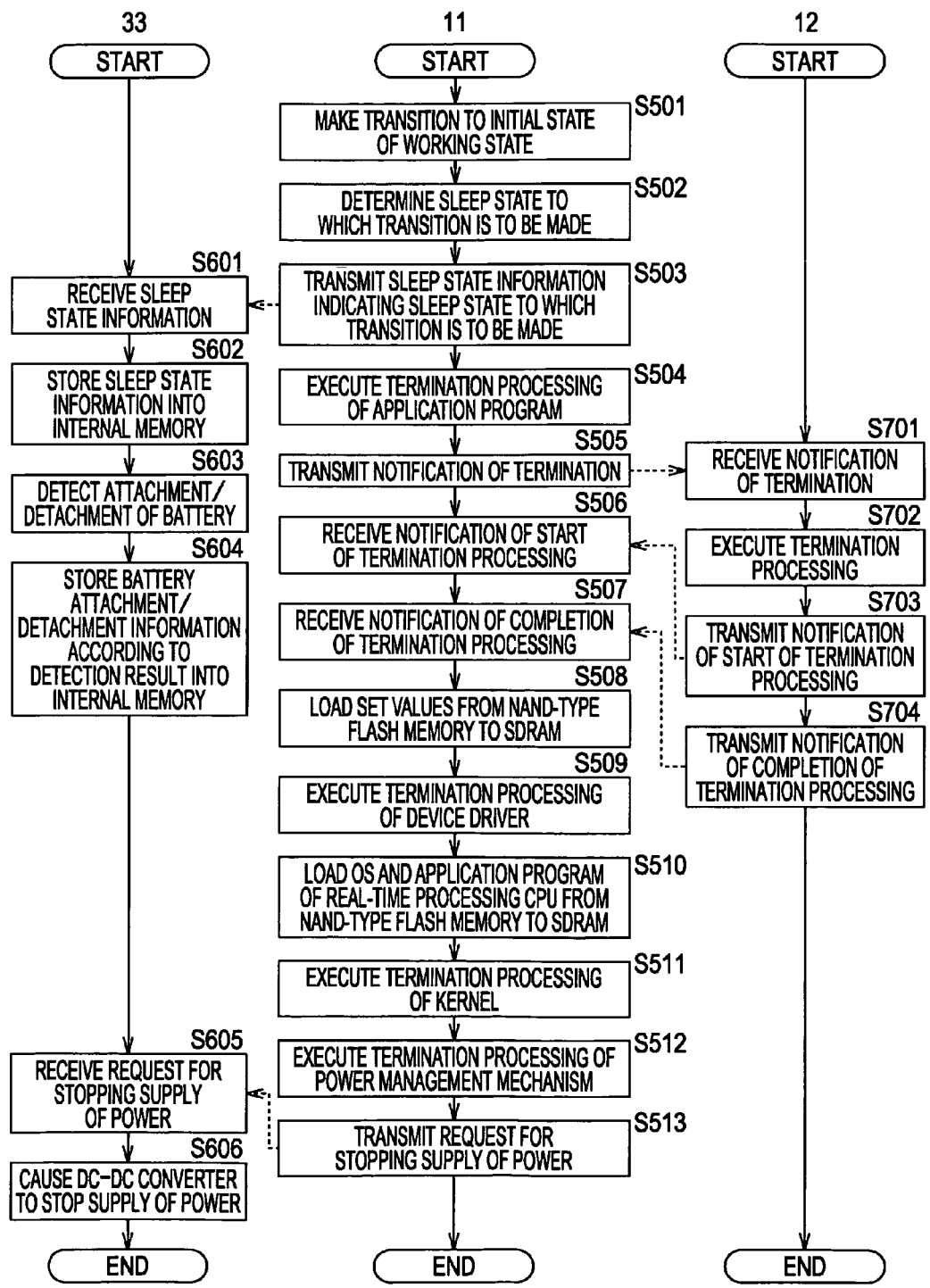
FIG. 23 is a flowchart illustrating an example of sleep processing.

Since steps S531 through S539, steps S631 through S634, and steps S731 through S734 are respectively the same as steps S501 through S509, steps S601 through S604, and steps S701 through S704 in FIG. 23, description thereof is omitted.

In the termination processing of the device driver 72 during the sleep processing shown in the flowchart of FIG. 24, the operating system 141 and application program 142 of the real-time processing CPU 12 are not loaded to the SDRAM 29.

Since steps S540 through S542, and steps S635 and S636 are respectively the same as steps S511 through S513, and steps S605 and S606 in FIG. 23, description thereof is omitted.

In this way, the operating system 141 and application program 142 of the real-time processing CPU 12 may not be loaded to the SDRAM 29 in the termination processing of the device driver 72.

Since it takes a predetermined period of time to load the operating system 141 and the application program 142 to the SDRAM 29, if loading of the operating system 141 and the application program 142 to the SDRAM 29 is not performed, sleep processing can be performed in a shorter time.

Incidentally, the set values to be stored into the NAND-type flash memory 17 in step S538 do not include the values of internal registers of the real-time processing CPU 12 and the values of registers of the internal interface of the real-time processing CPU 12, which are stored and managed in the SDRAM 29 as variables for the operating system 141 and the application program 142.

Therefore, it is thus possible to reduce the storage capacity of the storage area of the NAND-type flash memory 17 required for the storage of set values.

Also, in a case where the activation processing by a hot boot described above with reference to the flowchart of FIGS. 17 through 19 is executed after the sleep processing shown in the flowchart of FIG. 24, prior to step S242, the host CPU 11 executing the other-CPU-program reading program 124 of the secondary boot loader 101 loads the operating system 141 and application program 142 of the real-time processing CPU 12 from the NAND-type flash memory 17 to the SDRAM 29.

Next, description will be given of the storage processing of a history of detachment of the battery 35, which is executed at every predetermined period by the embedded controller 33, which is supplied with power from the DC-DC converter 34 in a sleep state and is supplied with electric power from the battery 36 in the mechanical off state G3.

Figure 25:
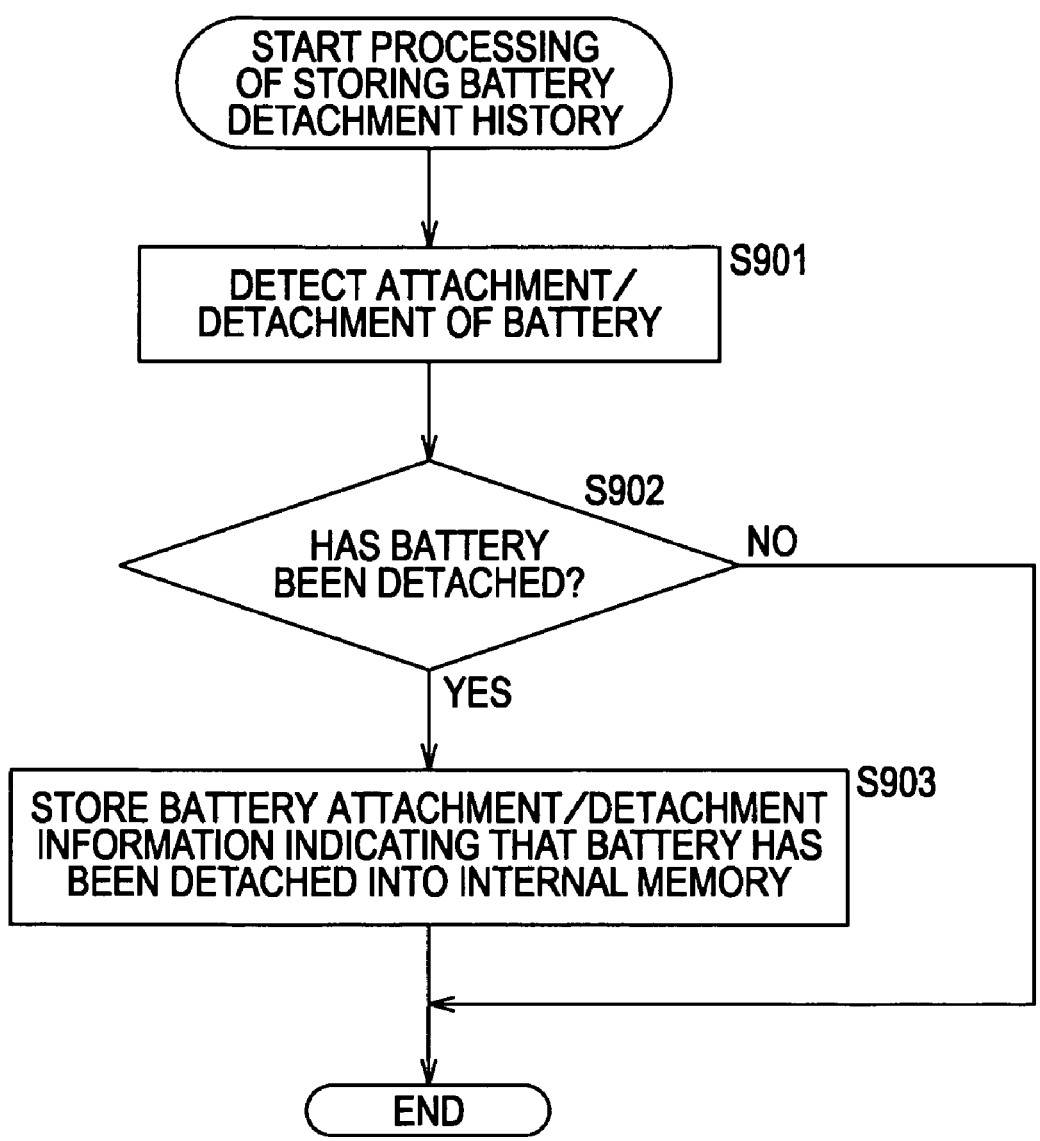
FIG. 25 is a flowchart illustrating the storage processing of a history of detachment of a battery.

FIG. 25 is a flowchart illustrating the storage processing of a history of detachment of the battery 35. In step S901, the embedded controller 33 executing the battery attachment/detachment detecting program 206 detects attachment/detachment of the battery 35 by detecting the output voltage of the DC-DC converter 34. For example, in step S901, the battery attachment/detachment detecting program 206 detects attachment or detachment of the battery 35 by comparing the output voltage of the DC-DC converter 34 and a predetermined threshold against each other.

In step S902, the embedded controller 33 executing the activation-mode-determining-information storage processing program 204 determines whether or not the battery 35 has been detached. If it is determined in step S902 that the battery 35 has been detached, the procedure proceeds to step S903, where the embedded controller 33 executing the activation-mode-determining-information storage processing program 204 stores battery attachment/detachment information indicating that the battery 35 has been detached into its internal memory, and the processing ends. That is, if the battery 35 has been detached, the battery attachment/detachment information stored in the embedded controller 33 is updated so as to indicate that the battery 35 has been detached.

If it is determined in step S902 that the battery 35 has not been detached, there is no need to update the battery attachment/detachment information stored in the embedded controller 33, so step S903 is skipped, and the processing ends.

In this way, when the battery 35 is detached in a sleep state, battery attachment/detachment information is updated so as to indicate that the battery 35 has been detached. Thus, the battery attachment/detachment information indicates the history of attachment/detachment of the battery 35 in a sleep state.

Incidentally, a configuration may also be employed in which, in step S901, the embedded controller 33 executing the battery attachment/detachment detecting program 206 detects the stoppage of supply of power from an external power source by detecting the output voltage of the DC-DC converter 34, and in step S902, the embedded controller 33 executing the activation-mode-determining-information storage processing program 204 determines whether or not supply of power from the external power source has been stopped, and if supply of power from the external power source has been stopped, in step S903, the embedded controller 33 executing the activation-mode-determining-information storage processing program 204 stores battery attachment/detachment information indicating that supply of power from the external power source has been stopped, into its internal memory. That is, in this case, the battery attachment/detachment information indicates the history of supply of power from the external power source.

Furthermore, a configuration may also be employed in which, in step S901, the embedded controller 33 executing the battery attachment/detachment detecting program 206 detects the stoppage of supply of power from an external power source and attachment/detachment of the battery 35 by detecting the output voltage of the DC-DC converter 34, and in step S902, the embedded controller 33 executing the activation-mode-determining-information storage processing program 204 determines whether or not supply of power from the external power source has been stopped and the battery 35 has been detached, and if supply of power from the external power source has been stopped and the battery 35 has been detached, in step S903, the embedded controller 33 executing the activation-mode-determining-information storage processing program 204 stores battery attachment/detachment information indicating that supply of power from the external power source has been stopped and that the battery 35 has been detached, into its internal memory.

That is, battery attachment/detachment information is an example of information indicating the history of stoppage of supply of power for maintaining the suspend state S3 in a sleep state. Also, in this case, the battery attachment/detachment detecting program 206 detects the stoppage of supply of power for maintaining the suspend state S3 in a sleep state.

Figure 26:
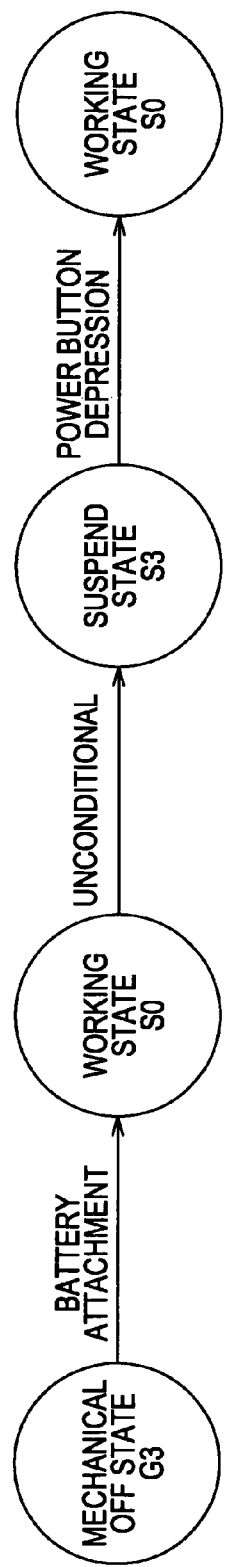
FIG. 26 is a diagram showing an example of state transition at activation.

Incidentally, as shown in FIG. 26, a configuration may be employed in which, when the battery 35 is attached in the mechanical off state G3, with this attachment of the battery 35 as an activation trigger, the digital still camera is activated in accordance with the mode of activation by a cold boot or a warm boot so that a transition is made to the working state S0, and then the state unconditionally transitions from this working state S0 to the suspend state S3. In this case, an activation screen is not displayed, and activation sound is not outputted, either.

Thus, even in a case where activation processing by a cold boot or a warm boot takes a long time, the digital still camera can be put to sleep in the suspend state S3 by simply attaching the battery 35 without the user being aware of it.

Then, when the power button is depressed in the suspend state S3, the digital still camera is activated according to the mode of activation by a hot boot so as to transition to the working state S0. It is a matter of course that the digital still camera may, due to another activating factor such as the opening of the lens cap, transition from the suspend state S3 to the working state S0 in accordance with the mode of activation by a hot boot.

As a result, it appears to the user as if activation was quickly done from the mechanical off state G3 with the depression of the power button or the like as a trigger.

As described above, in accordance with a user's operation, the digital still camera can transition in its state to a sleep state or to the working state S0, and in the case of a transition from a sleep state to the working state S0, it is possible to achieve quick transition, that is, quick activation.

In a case where, during sleep in the suspend state S3, activation has been performed without the battery 35 being detached by the user, activation is done by a hot boot. Also, in a case where, during sleep in the suspend state S3, the user detaches the battery 35 and attaches the battery 35 again, activation is done by a warm boot. Furthermore, when entering sleep in the hibernation S4, activation is done by a warm boot irrespective of whether the battery 35 is attached or detached. Thus, from the user, it appears as if the sleep state were a state in which power is turned off (mechanical off state G3).

As described above, in the case where a transition is made to the suspend state as a sleep state, a resume can be performed from the suspend state. Also, before entering a suspend state, a state is caused to transition to an initial state, which is an initial state of a working state and in which execution of application processing is inhibited, a signal indicating an activating factor that serves as an activation trigger is acquired, and when activating from the suspend state, a return is made to the initial state, and upon returning to the initial state by activation, a state is caused to transition to an application execution state in which the application processing according to the activating factor is executed. In this case, activation can be performed more quickly so as to enter a state according to a user's operation.

Furthermore, before entering a suspend state, a state is caused to transition to an initial state, which is an initial state of a working state and in which execution of application processing is inhibited, information indicating an activating factor that serves as an activation trigger is acquired, and when activating from the suspend state, a return is made to the initial state, and upon returning to the initial state by activation, a state is caused to transition to an application execution state in which the application processing according to the activating factor is executed. In this case, activation can be performed more quickly so as to enter a state according to a user's operation.

Incidentally, the present invention is applicable not only to a digital still camera but also to a personal computer, a digital video camera, a portable telephone, or a portable player, or various kinds of stationary equipment such as an HDD recorder player or a television receiver.

Also, it has been described that in the case of activation by a warm boot or a cold boot, a transition is made to the initial state SON. However, in the case of activation by a warm boot or a cold boot as well, a transition may be made to, of the working state S0, a state in which processing according to an activating factor is executed.

The series of processing described above can be executed by hardware or can be executed by software. If the series of processing is to be executed by software, a program constituting that software is installed from a program-recording medium into a computer embedded in dedicated hardware, or into, for example, a general-purpose personal computer or the like that can execute various functions when installed with various programs.

The program to be executed by the computer (the host CPU 11, the real-time processing CPU 12, or the embedded controller 33) is provided by being recorded on a removable medium as a package medium such as a magnetic disc (including a flexible disc), an optical disc (CD-ROM (Compact Disc-Read Only Memory), a DVD (Digital Versatile Disc) or the like), a magneto-optical disc, or a semiconductor memory, or via a wired or wireless transmission medium such as the local area network, the Internet, or digital satellite broadcasting.

Then, the program can be installed by storing the program into the NAND-type flash memory 17 via the IDE interface 28, by mounting the removable medium in a drive connected to the IDE interface 28. Also, the program can be installed by receiving the program by the wireless LAN interface 24 via a wireless transmission medium, or by receiving the program by the general-purpose input/output unit 32 via a wired transmission medium, and storing the program into the NAND-type flash memory 17. Alternatively, a program can be installed in advance by storing the program into the NAND-type flash memory 17.

Incidentally, the program executed by the computer may be a program in which processing is performed time sequentially in the order as described in this specification, or may be a program in which processing is performed in a parallel fashion or at required timing such as when invoked.

The invention claimed is:

1. An information processing apparatus comprising:
   state transition means for causing a state to transition to an initial state, which is an initial state of a working state and in which execution of application processing is inhibited, before entering a suspend state;
   acquiring means for acquiring a signal indicating an activating factor that serves as an activation trigger; and
   return processing executing means for executing return processing to the initial state when activating from the suspend state,
   wherein the state transition means causes a state to transition to an application execution state, in which the application processing according to the activating factor is executed, upon returning to the initial state by activation,
   wherein the transition to an application execution state is performed according to a hot boot procedure whereby the apparatus provides a user interface that has less functionality than a user interface otherwise provided for the application.

2. The information processing apparatus according to claim 1, wherein:
   the state transition means causes a state to transition to an application execution state, in which the application processing according to the activating factor which is one of shooting processing and browse processing is executed, upon returning to the initial state by activation.

3. The information processing apparatus according to claim 1, wherein:
   the state transition means and the return processing executing means are realized by a first CPU (Central Processing Unit) for which supply of power is stopped in the suspend state; and
   the acquiring means is realized by a second CPU to which power is supplied in the suspend state.

4. The information processing apparatus according to claim 3, wherein:
   the state transition means is realized by the first CPU executing an application program;
   the return processing executing means is realized by the first CPU executing the application program and an operating system; and
   the acquiring means is realized by the second CPU executing a program different from the application program and the operating system.

5. The information processing apparatus according to claim 3, wherein:
   the second CPU controls cancellation of reset of the first CPU, when activating from the suspend state.

6. The information processing apparatus according to claim 3, wherein:
   the second CPU controls supply of power to the first CPU.

7. An activation method comprising the steps of:
   causing a state to transition to an initial state, which is an initial state of a working state and in which execution of application processing is inhibited, before entering a suspend state;
   acquiring a signal indicating an activating factor that serves as an activation trigger;
   returning to the initial state when activating from the suspend state; and
   causing a state to transition to an application execution state, in which the application processing according to the activating factor is executed, upon returning to the initial state by activation,
   wherein the transition to an application execution state is performed according to a hot boot procedure whereby an apparatus implementing the method provides a user interface that has less functionality than a user interface otherwise provided for the application.

8. A program for causing a computer to perform processing including the steps of:

causing a state to transition to an initial state, which is an initial state of a working state and in which execution of application processing is inhibited, before entering a suspend state;

acquiring information indicating an activating factor that serves as an activation trigger;

returning to the initial state, when activating from the suspend state; and causing a state to transition to an application execution state, in which the application processing according to the activating factor is executed, upon returning to the initial state by activation, wherein the transition to an application execution state is performed according to a hot boot procedure whereby the computer provides a user interface that has less functionality than a user interface otherwise provided for the application.

* * * * *